(12) United States Patent
Kawakami

(10) Patent No.: US 10,745,082 B2
(45) Date of Patent: Aug. 18, 2020

(54) BICYCLE OPERATING DEVICE

(71) Applicant: Shimano Inc., Sakai, Osaka (JP)

(72) Inventor: Tatsuya Kawakami, Osaka (JP)

(73) Assignee: Shimano Inc., Osaka (JP)

( * ) Notice: Subject to any disclaimer, the term of this patent is extended or adjusted under 35 U.S.C. 154(b) by 171 days.

(21) Appl. No.: 16/126,368

(22) Filed: Sep. 10, 2018

(65) Prior Publication Data

US 2019/0100281 A1 Apr. 4, 2019

(30) Foreign Application Priority Data

Sep. 29, 2017 (JP) .................. 2017-189814

(51) Int. Cl.
| | |
|---|---|
| *B62M 25/04* | (2006.01) |
| *B62K 23/06* | (2006.01) |
| *B62K 23/02* | (2006.01) |
| *B62J 1/08* | (2006.01) |
| *B62K 25/04* | (2006.01) |
| *F16C 1/18* | (2006.01) |
| *G05G 1/04* | (2006.01) |
| *G05G 5/06* | (2006.01) |

(52) U.S. Cl.
CPC ............ *B62M 25/04* (2013.01); *B62J 1/08* (2013.01); *B62K 23/02* (2013.01); *B62K 23/06* (2013.01); *B62K 25/04* (2013.01); *F16C 1/18* (2013.01); *G05G 1/04* (2013.01); *G05G 5/06* (2013.01); *B62J 2001/085* (2013.01); *B62K 2025/048* (2013.01); *G05G 2505/00* (2013.01)

(58) Field of Classification Search
CPC ....... B62M 25/04; B62M 25/02; B62K 23/06; B62K 23/02; F16C 1/18; F16C 1/12; G05G 1/04; Y10T 74/20402; Y10T 74/2042; Y10T 74/20426; Y10T 74/20438
See application file for complete search history.

(56) References Cited

U.S. PATENT DOCUMENTS

| | | | | |
|---|---|---|---|---|
| 7,721,621 | B2 * | 5/2010 | Kawakami | B62M 25/04 |
| | | | | 74/489 |
| 7,762,157 | B2 * | 7/2010 | Kawakami | B62K 23/06 |
| | | | | 74/473.14 |
| 8,397,601 | B2 * | 3/2013 | Fukao | B62K 23/06 |
| | | | | 74/473.14 |
| 9,592,880 | B2 * | 3/2017 | Kawakami | G05G 5/24 |
| 10,450,035 | B2 * | 10/2019 | Kawakami | B62M 25/04 |

FOREIGN PATENT DOCUMENTS

| | | |
|---|---|---|
| CN | 103879509 B | 3/2017 |
| JP | 2007-1561 A | 1/2007 |

* cited by examiner

*Primary Examiner* — Jeremy R Severson
(74) *Attorney, Agent, or Firm* — Global IP Counselors, LLP

(57) ABSTRACT

A bicycle operating device includes a base member, an actuator arranged to be movable with respect to the base member and having a cable holder, and a user operated input arranged to be movable with respect to the base member to move the actuator. In a state where the actuator is located in a first position, the user operated input moves the actuator from the first position to a second position by being operated with respect to the base member in a first direction. In a state where the actuator is located in the second position, the user operated input moves the actuator from the second position to the first position by being operated in the first direction or a second direction, which differs from the first direction.

32 Claims, 10 Drawing Sheets

BICYCLE OPERATING DEVICE

CROSS-REFERENCE TO RELATED APPLICATIONS

This application claims priority to Japanese Patent Application No. 2017-189814, filed on Sep. 29, 2017. The entire disclosure of Japanese Patent Application No. 2017-189814 is hereby incorporated herein by reference.

BACKGROUND

Field of the Invention

The present invention generally relates to a bicycle operating device.

Background Information

A bicycle operating device that operates a bicycle component is known. In the prior art, a bicycle operating device includes a base member, an actuator connected to a cable of a bicycle component, and two user operated inputs (operating members) arranged to be movable with respect to the base member to move the actuator. In accordance with operation of the user operated inputs, the actuator moves with respect to the base member, and the bicycle component is operated via the cable. Japanese Laid-Open Patent Publication No. 2007-1561 (Patent document 1) discloses one example of a prior art bicycle operating device.

SUMMARY

It is desirable that the number of parts in a bicycle operating device be reduced. One object of the present invention to provide a bicycle operating device that contributes to reduction in the number of parts.

A bicycle operating device according to a first aspect of the present invention includes a base member, an actuator and a user operated input. The actuator is movably arranged with respect to the base member and having a cable holder. The user operated input is movably arranged with respect to the base member to move the actuator. In a state where the actuator is located in a first position with respect to the base member, the user operated input moves the actuator from the first position to a second position with respect to the base member in response to being operated with respect to the base member in a first direction. The second position is different from the first position. In a state where the actuator is located in the second position, the user operated input moves the actuator from the second position to the first position in response to being operated in the first direction. In a state where the actuator is located in the second position, the user operated input moves the actuator from the second position to the first position by being operated in a second direction, which differs from the first direction. The bicycle component is operated by the single user operated input. Thus, the number of parts in the bicycle operating device is reduced. Additionally, in a case where the user operated input is operated in any of the first direction and the second direction, the actuator is moved from the second position to the first position. This improves the operability of the bicycle operating device.

In accordance with a second aspect of the present invention, the bicycle operating device according to the first aspect further includes a positioning catch arranged with respect to the base member to selectively maintain the actuator in each of the first position and the second position. Thus, the actuator is appropriately positioned in each of the first position and the second position.

In accordance with a third aspect of the present invention, the bicycle operating device according to the second aspect is configured so that the actuator includes a first actuation engagement portion. The first actuation engagement portion is arranged to engage the positioning catch. The engagement of the first actuation engagement portion with the positioning catch appropriately positions the actuator in the corresponding position.

In accordance with a fourth aspect of the present invention, the bicycle operating device according to the third aspect is configured so that the positioning catch includes a first positioning portion that engages with the first actuation engagement portion in a state where the actuator is located in the second position, and the first positioning portion positions the actuator in the second position by engaging with the first actuation engagement portion. Thus, the actuator is appropriately positioned in the second position.

In accordance with a fifth aspect of the present invention, the bicycle operating device according to the fourth aspect further includes an engagement hook provided to the user operated input and the actuator includes a second actuation engagement portion. The engagement hook alternately engages each of the second actuation engagement portion and the positioning catch. The engagement hook moves the actuator. Thus, the configuration of the bicycle operating device is simplified.

In accordance with a sixth aspect of the present invention, the bicycle operating device according to the fifth aspect is configured so that in a state where the actuator is located in the first position, the engagement hook engages with the second actuation engagement portion. Upon the user operated input being operated in the first direction, the engagement hook moves the actuator in the first direction. The engagement hook moves the actuator in the first direction. Thus, the configuration of the bicycle operating device is simplified.

In accordance with a seventh aspect of the present invention, the bicycle operating device according to the fifth aspect is configured so that the positioning catch includes a second positioning portion that engages with the engagement hook in a state where the actuator is located in the second position. The engagement of the engagement hook with the second positioning portion positions the engagement hook.

In accordance with an eighth aspect of the present invention, the bicycle operating device according to the seventh aspect is configured so that in a state where the actuator is located in the second position, upon the user operated input being operated in the first direction, the engagement hook moves the positioning catch with respect to the base member so that the first actuation engagement portion disengages from the first positioning portion. Thus, the operation of the user operated input in the first direction moves the actuator from the second position to the first position.

In accordance with a ninth aspect of the present invention, the bicycle operating device according to the seventh or eighth aspect is configured so that in a state where the actuator is located in the second position, upon the user operated input being operated in the second direction, the engagement hook moves the positioning catch with respect to the base member so that the first actuation engagement portion disengages from the first positioning portion. Thus, the operation of the user operated input in the second direction moves the actuator from the second position to the first position.

In accordance with a tenth aspect of the present invention, the bicycle operating device according to the ninth aspect further includes a linkage that moves the engagement hook with respect to the user operated input so that the first actuation engagement portion disengages from the first positioning portion. Thus, the first actuation engagement portion is appropriately disengaged from the first positioning portion.

In accordance with an eleventh aspect of the present invention, the bicycle operating device according to the tenth aspect is configured so that the linkage includes a contact portion. In a state where the actuator is located in the second position, the user operated input is operated in the second direction to force the contact portion against the actuator and generates a reaction force generated in the contact portion by contact with the actuator being transferred to the engagement hook. Thus, the first actuation engagement portion is disengaged from the first positioning portion with the simple configuration.

In accordance with a twelfth aspect of the present invention, the bicycle operating device according to any one of the third to eleventh aspects is configured so that the positioning catch includes a third positioning portion that engages with the first actuation engagement portion in a state where the actuator is located in the first position. The third positioning portion positions the actuator in the first position by engaging with the first actuation engagement portion. Thus, the actuator is appropriately positioned in the first position.

In accordance with a thirteenth aspect of the present invention, the bicycle operating device according to the twelfth aspect is configured so that in a state where the actuator is located in the first position, the user operated input disengages the first actuation engagement portion from the third positioning portion by being operated in the first direction. Thus, in a state where the actuator is located in the first position, the user operated input is operated in the first direction to move the actuator from the first position to the second position.

In accordance with a fourteenth aspect of the present invention, the bicycle operating device according to the thirteenth aspect is configured so that the positioning catch has a positioning position and a release position, which differs from the positioning position. The user operated input is operated in the first direction to move the positioning catch from the positioning position to the release position. The user operated input is operated in the first direction to move the positioning catch so that the first actuation engagement portion is released from the positioning catch. This forms a state in which the positioning catch can position the actuation ember in the second position.

In accordance with a fifteenth aspect of the present invention, the bicycle operating device according to any one of the second to fourteenth aspects further includes a reference shaft supporting the actuator and the user operated input to rotate with respect to the base member about a center axis of the reference shaft. Thus, the operability of the user operated input is improved.

In accordance with a sixteenth aspect of the present invention, the bicycle operating device according to the fifteenth aspect further includes a first biasing member that biases the user operated input with respect to the base member in the second direction. Thus, the operability of the user operated input is improved.

In accordance with a seventeenth aspect of the present invention, the bicycle operating device according to any one of the second to sixteenth aspects further includes a holding shaft supporting the positioning catch to rotate about a center axis of the holding shaft. Thus, the positioning catch is easily moved.

In accordance with an eighteenth aspect of the present invention, the bicycle operating device according to the seventeenth aspect is configured so that the user operated input is operated in the first direction or the second direction to rotate the positioning catch in a third direction about the center axis of the holding shaft. Thus, in a case where the user operated input is operated in any of the first direction and the second direction, the actuator is moved from the second position to the first position.

In accordance with a nineteenth aspect of the present invention, the bicycle operating device according to the eighteenth aspect further includes a second biasing member that biases the positioning catch in a fourth direction that is opposite to the third direction. Thus, the configuration of the bicycle operating device is simplified.

In accordance with a twentieth aspect of the present invention, the bicycle operating device according to any one of the first to nineteenth aspects further includes a third biasing member that biases the actuator with respect to the base member in the second direction. Thus, the configuration of the bicycle operating device is simplified.

In accordance with a twenty-first aspect of the present invention, the bicycle operating device according to any one of the first to twentieth aspects is configured so that the user operated input is operable in the first direction and the second direction to be located in one of a first rest position in a state where the actuator is located in the first position and a second rest position in a state where the actuator is located in the second position. The bicycle operating device further includes a position adjuster configured to adjust the second rest position with respect to the first rest position. Since the second rest position is adjustable by the position adjuster, the usability of the bicycle operating device is improved. Additionally, in a case where the first rest position differs from the second rest position, the state of the bicycle component can be acknowledged by determining the rest position of the user operated input. Thus, the user operated input also functions to report the state of the bicycle component. This contributes to reduction in the number of parts in the bicycle operating device.

A bicycle operating device according to a twenty-second aspect of the present invention includes a base member, an actuator, a user operated input, and a position adjuster. The actuator is movably arranged with respect to the base member and having a cable holder. The user operated input rests in a first rest position with respect to the base member in a state where the actuator is located in a first position. The user operated input moves the actuator from the first position to a second position with respect to the base member upon being operated in a first direction with respect to the base member. The user operated input rests in a second rest position in a state where the actuator is located in the second position. The position adjuster is configured to adjust the second rest position with respect to the first rest position. Since the second rest position is adjustable by the position adjuster, the usability of the bicycle operating device is improved. Additionally, in a case where the first rest position differs from the second rest position, the state of the bicycle component can be acknowledged by determining the rest position of the user operated input. Thus, the user operated input also functions to report the state of the bicycle component. This contributes to reduction in the number of parts in the bicycle operating device.

In accordance with a twenty-third aspect of the present invention, the bicycle operating device according to the twenty-first or twenty-second aspect is configured so that the position adjuster is operatively coupled to the user operated input to adjust the second rest position so that the second rest position is located at one of a plurality of adjustment positions. Thus, the usability of the bicycle operating device is improved.

In accordance with a twenty-fourth aspect of the present invention, the bicycle operating device according to the twenty-third aspect is configured so that a rest position interval is a distance between the first rest position and the second rest position. The plurality of adjustment positions includes a first adjustment position at which the rest position interval is shortest, a second adjustment position at which the rest position interval is longest, and a third adjustment position at which the rest position interval is longer than at the first adjustment position and is shorter than at the second adjustment position. Thus, the usability of the bicycle operating device is improved.

In accordance with a twenty-fifth aspect of the present invention, the bicycle operating device according to the twenty-third or twenty-fourth aspect is configured so that the position adjuster includes a first member and a second member, which are provided to the user operated input. The first member includes a plurality of first adjustment engagement portions respectively corresponding to the plurality of adjustment positions. The second member includes a second adjustment engagement portion that engages with each of the plurality of first adjustment engagement portions. The second rest position is adjusted by combinations that engage the plurality of first adjustment engagement portions with the second adjustment engagement portion. Thus, the configuration of the position adjuster is simplified.

In accordance with a twenty-sixth aspect of the present invention, the bicycle operating device according to any one of the first to twenty-fifth aspects further includes a housing that accommodates the actuator. Thus, the actuator is protected by the housing.

In accordance with a twenty-seventh aspect of the present invention, the bicycle operating device according to the twenty-sixth aspect is configured so that the housing includes a first housing part and a second housing part that is a part of the user operated input, the user operated input further includes an operating portion coupled to the first housing part. The first housing part is rotatable with respect to the second housing part, and the actuator is rotatable with respect to the first housing part and the second housing part. Thus, the actuator is protected by the first housing part and the second housing part.

In accordance with a twenty-eighth aspect of the present invention, the bicycle operating device according to the twenty-seventh aspect further includes a bicycle attachment coupled to the housing to mount on a handlebar of the bicycle. Thus, the bicycle operating device is easily mounted on the handlebar of the bicycle.

In accordance with a twenty-ninth aspect of the present invention, the bicycle operating device according to the twenty-eighth aspect is configured so that the housing includes a facing surface facing the handlebar. The bicycle attachment is arranged with respect to the housing so that in a mounted state in which the bicycle attachment is mounted on the handlebar, the facing surface of the housing is inclined with respect to a center axis of the handlebar. Thus, the operability of the bicycle operating device is improved.

In accordance with a thirtieth aspect of the present invention, the bicycle operating device according to the twenty-ninth aspect is configured so that a distance between the first housing part and the handlebar in the mounted state is shorter than a distance between the second housing part and the handlebar in the mounted state. Since the distance between the handlebar of the bicycle and the operating portion is decreased, the operability of the bicycle operating device is improved.

In accordance with a thirty-first aspect of the present invention, the bicycle operating device according to any one of the first to thirtieth aspects is configured so that the cable holder of the actuator is attached to a bicycle component that includes one or more of a shifting device, a suspension or an adjustable seatpost. Thus, various bicycle components can be operated by the bicycle operating device.

In accordance with a thirty-second aspect of the present invention, the bicycle operating device according to the thirty-first aspect is configured so that the bicycle component is a front derailleur. Thus, the front derailleur is operated by the bicycle operating device.

The bicycle operating device of the present invention contributes to reduction in the number of parts.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

Figure 1:
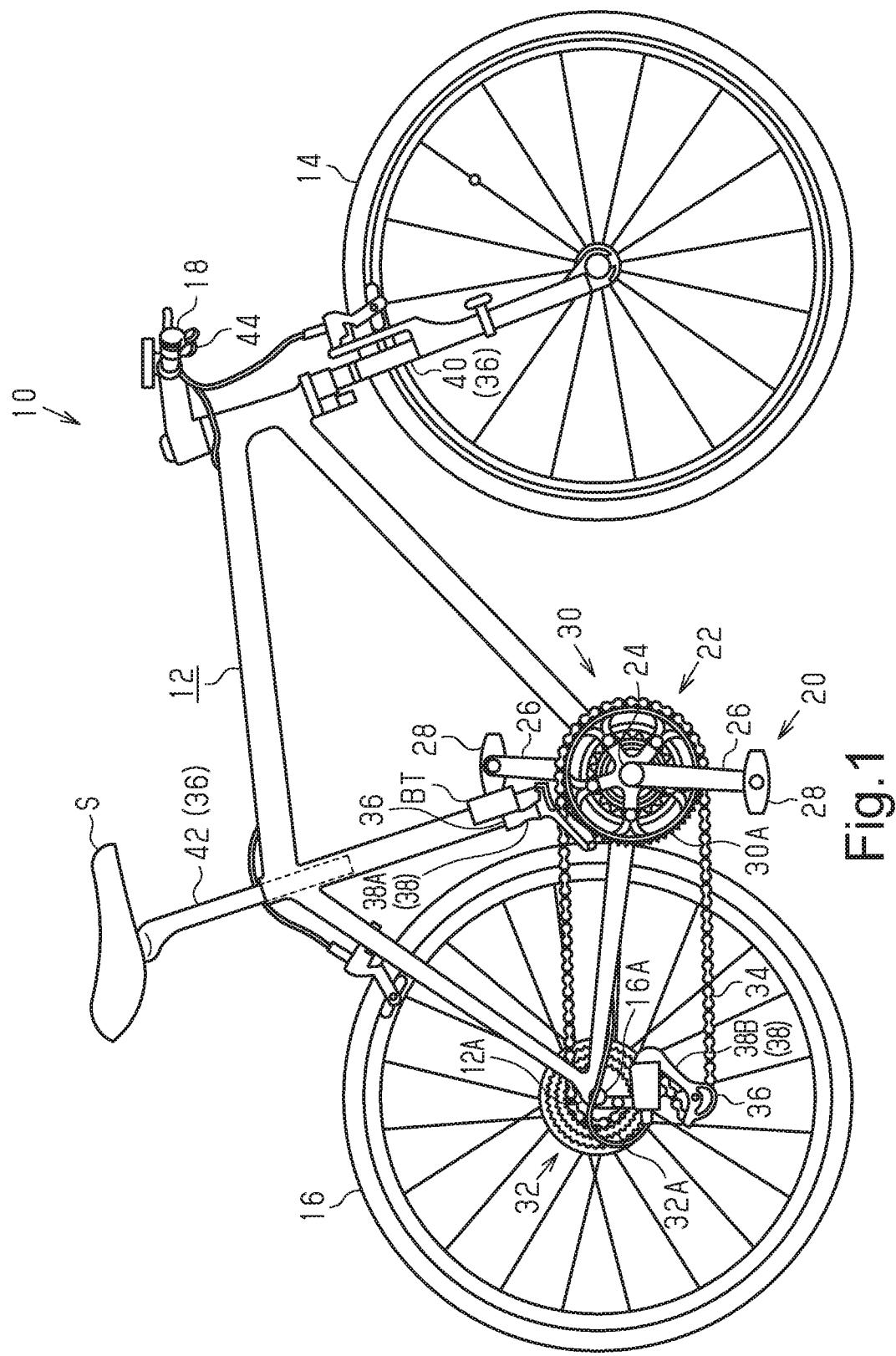
FIG. 1 is a side elevational view of a bicycle including a first embodiment of a bicycle operating device.

A bicycle 10 including a bicycle operating device 50 will now be described with reference to FIG. 1. The bicycle 10 includes the bicycle operating device 50 (hereinafter referred to as "the operating device 50") (refer to FIG. 2). The type of the bicycle 10 illustrated in the drawing is a trekking bike. In one example, the bicycle 10 further includes a frame 12, a front wheel 14, a rear wheel 16, a handlebar 18 and a drive train 20. The operating device 50 is arranged, for example, on the left side of the handlebar 18 (refer to FIG. 2). The operating device 50 can be arranged on the right side of the handlebar 18.

The drive train 20 includes a crank assembly 22, a front sprocket assembly 30, a rear sprocket assembly 32 and a chain 34. The crank assembly 22 includes the crankshaft 24, a pair of crank arms 26 and a pair of pedals 28. The pedals 28 are rotatably coupled to distal ends of the crank arms 26, respectively.

The front sprocket assembly 30 includes one or more front sprockets 30A and is provided, for example, on the crank assembly 22 to rotate integrally with the crankshaft 24. The rear sprocket assembly 32 includes one or more rear sprockets 32A and is provided on a hub 16A of the rear wheel 16. The chain 34 wraps around any one of the front sprockets 30A in the front sprocket assembly 30 and any one of the rear sprockets 32A in the rear sprocket assembly 32. The transmission ratio of the bicycle 10 is changed by changing the combination of the front sprocket 30A and the rear sprocket 32A around which the chain 34 wraps. Driving force, which is applied by the rider of the bicycle 10 to the pedals 28, is transmitted via the front sprocket assembly 30, the chain 34 and the rear sprocket assembly 32 to the rear wheel 16.

The bicycle 10 further includes a bicycle component 36 and a shift operating device 44. The bicycle component 36 includes at least one of a shifting device 38, a suspension 40 and an adjustable seatpost 42. Here, the bicycle 10 includes a front derailleur 38A and a rear derailleur 38B as examples of the shifting device 38. The front derailleur 38A is arranged on the frame 12 at a position near the crankshaft 24. The rear derailleur 38B is arranged on a rear end 12A of the frame 12. The suspension 40 operates to absorb impact that the front wheel 14 or the rear wheel 16 receives from the ground surface. The adjustable seatpost 42 operates to change the height of a saddle S with respect to the frame 12.

Various kinds of elements included in the bicycle component 36 are driven by electric power supplied from a battery BT installed on the bicycle 10.

The shift operating device 44 is arranged, for example, on the right side of the handlebar 18. One example of the bicycle component 36, which serves as an operation subject of the shift operating device 44, is the rear derailleur 38B. In one example, an operation of the shift operating device 44 drives the rear derailleur 38B and changes the rear sprocket 32A on which the chain 34 is engaged, thereby changing the transmission ratio of the bicycle 10. One example of the bicycle component 36, which serves as an operation subject of the operating device 50, is the front derailleur 38A. In one example, an operation of the operating device 50 drives the front derailleur 38A and changes the front sprocket 30A on which the chain 34 is engaged, thereby changing the transmission ratio of the bicycle 10.

The structure of the operating device 50 will now be described with reference to FIGS. 2 to 5. The operating device 50 includes a base member 52, an actuator 54 (refer to FIG. 3) and a user operated input 56. As seen in FIG. 3, the actuator 54 is arranged to be movable with respect to the base member 52, and is connected to a cable C of the bicycle component 36. The user operated input 56 is arranged to be movable with respect to the base member 52 to move the actuator 54. One example of the cable C is a Bowden cable. The operating device 50 further includes a reference shaft 60. The actuator 54 and the user operated input 56 rotate with respect to the base member 52 about a center axis C1 of the reference shaft 60.

The operating device 50 further includes a housing 62 that accommodates the actuator 54 and a bicycle attachment 68 (refer to FIG. 2) provided to the housing 62 to mount on the handlebar 18 of the bicycle 10. One example of the material of the housing 62 is a metal material. One example of the metal material is aluminum. The reference shaft 60, for example, extends through the housing 62. The reference shaft 60 is supported by the housing 62. The housing 62 includes a first housing part 64 and a second housing part 66. Here, the second housing part 66 is a part of the user operated input 56. With the housing 62 separated into pieces, the first housing part 64 is one of the pieces of the housing 62, and the second housing part 66 is the other piece of the housing 62. In one example, the first housing part 64 is arranged to partially cover a portion of the second housing part 66. The first housing part 64 is rotatable with respect to the second housing part 66. The actuator 54 is rotatable with respect to the first housing part 64 and the second housing part 66.

Figure 2:
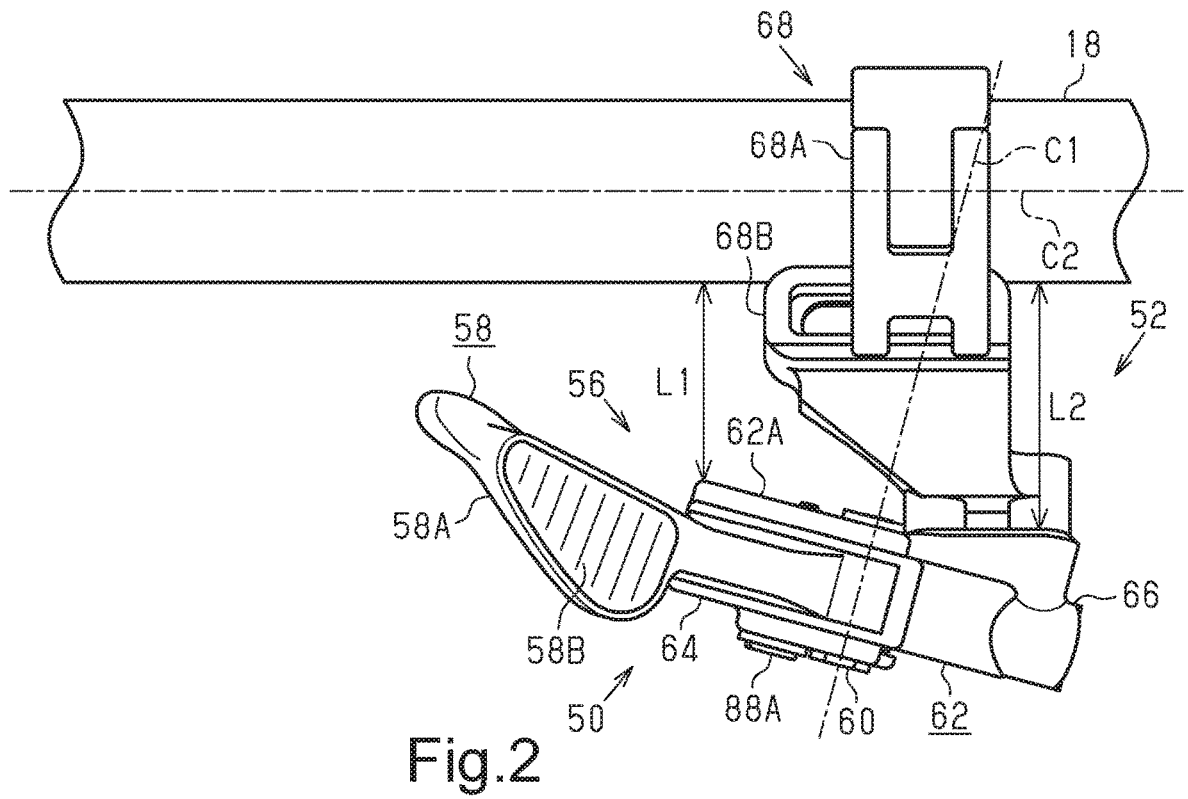
FIG. 2 is a rear side view of the bicycle operating device coupled to a handlebar of FIG. 1.
Figure 3:
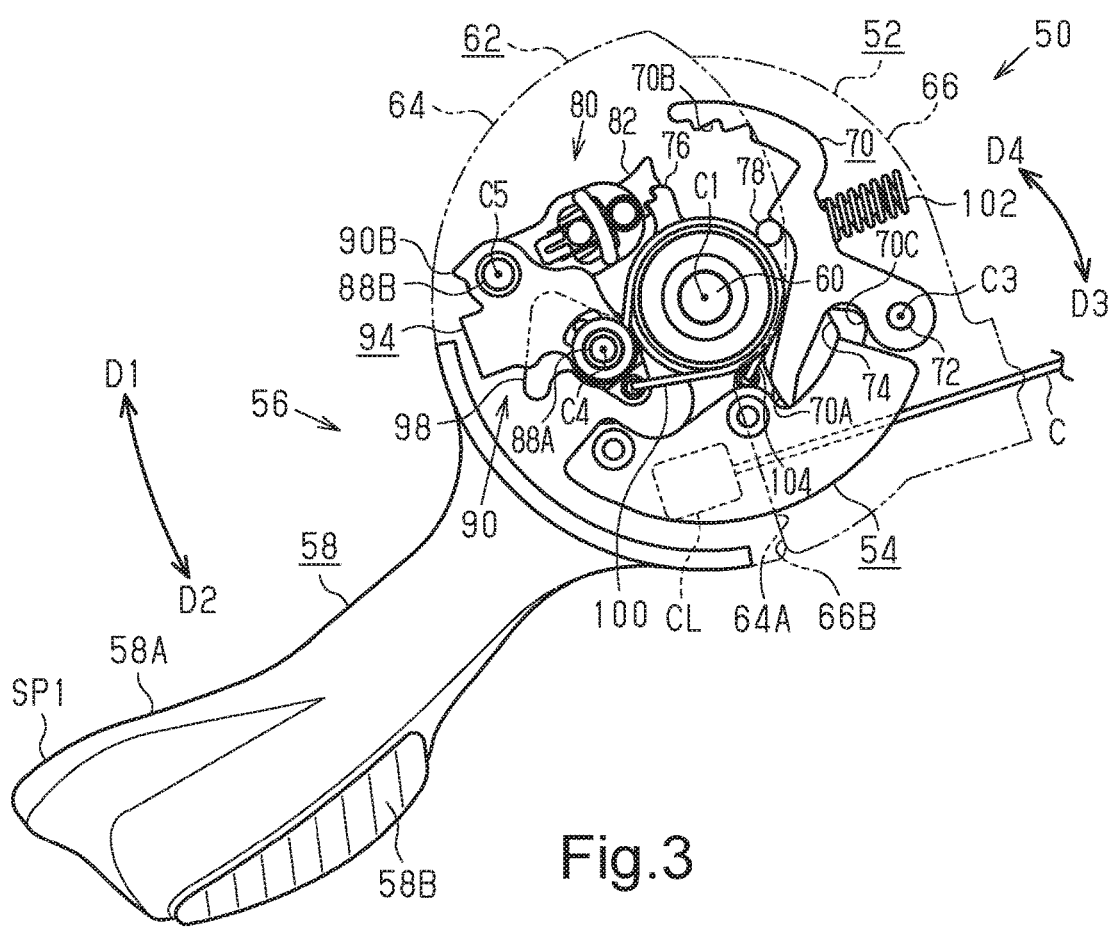
FIG. 3 is a top view of the bicycle operating device with selected parts removed to show an internal structure of the bicycle operating device shown in FIG. 2.

As shown in FIG. 2, the base member 52 includes the second housing part 66 and the bicycle attachment 68. The bicycle attachment 68 is coupled to the second housing part 66. The bicycle attachment 68 includes a clamp 68A and a connector 68B. The clamp 68A is detachably attached to the handlebar 18. The connector 68B connects the clamp 68A to the second housing part 66. The user operated input 56 includes the first housing part 64 and an operating portion 58 that is coupled to the first housing part 64. The operating portion 58 is integral with or a separate part that is attached to the first housing part 64. The operating portion 58 includes a lever 58A and a bellows-shaped elastic member 58B. The bellows-shaped elastic member 58B is coupled to the lever 58A and has a nonslip function. One example of the material of the lever 58A is a resin material. One example of the material of the elastic member 58B is a rubber material.

In this example, the operability of the user operated input 56 is improved. The elastic member 58B can be omitted from the operating portion 58.

The housing 62 includes a facing surface 62A that faces the handlebar 18. The bicycle attachment 68 is provided to the housing 62 so that in a mounted state in which the bicycle attachment 68 is mounted on the handlebar 18, the facing surface 62A of the housing 62 is inclined with respect to a center axis C2 of the handlebar 18. In other words, the bicycle attachment 68 is provided to the housing 62 so that the center axis C1 of the reference shaft 60 is not orthogonal to the center axis C2 of the handlebar 18 on a projection plane. In the example shown in FIG. 2, the distance between the first housing part 64 and the handlebar 18 in the mounted state (hereinafter referred to as "the first distance L1") is shorter than the distance between the second housing part 66 and the handlebar 18 in the mounted state (hereinafter referred to as "the second distance L2"). In this example, the bicycle attachment 68 is provided to the housing 62 so that in the mounted state, the operating portion 58 can approach the handlebar 18.

Figure 6:
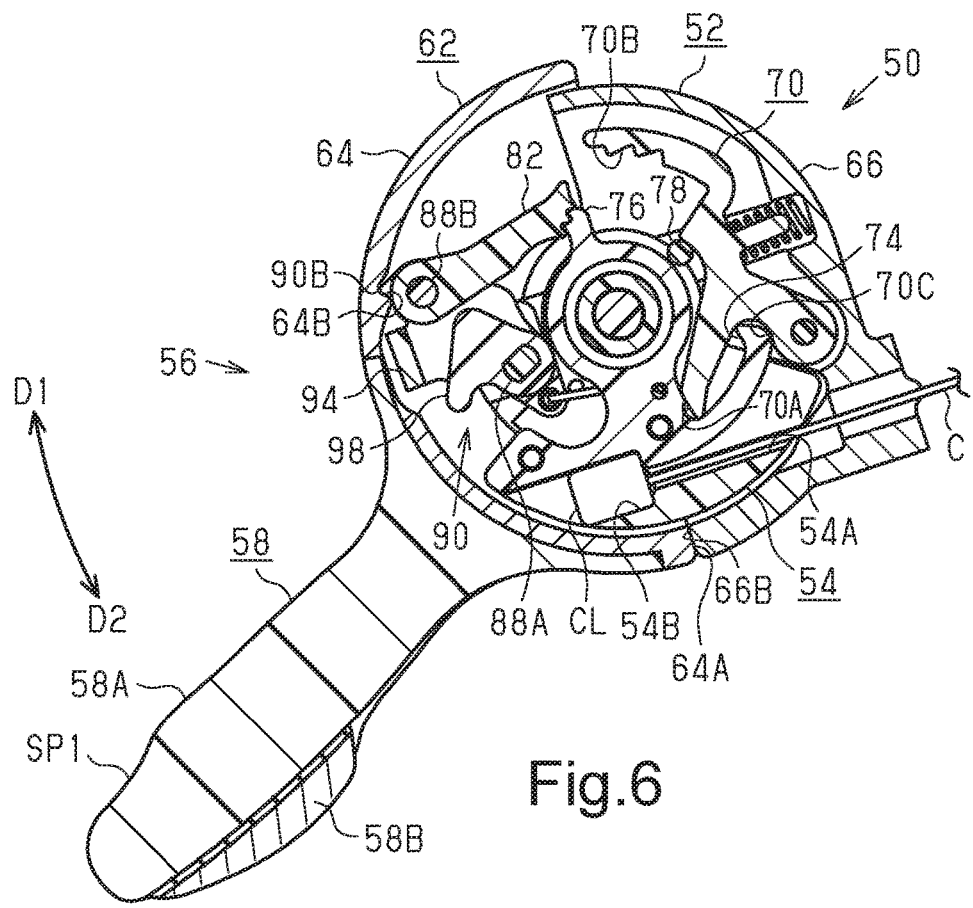
FIG. 6 is a cross-sectional view of the bicycle operating device shown in FIGS. 2 and 3 in which the bicycle operating device is in a first state.

As shown FIGS. 3 and 6, the cable C is provided with a cable connector CL connected to the actuator 54. The actuator 54 includes a cable passage 54A through which the cable C extends and a cable holder 54B that holds the cable connector CL (refer to FIG. 6). The cable holder 54B is provided to the cable passage 54A. The cable connector CL is held by the cable holder 54B, which is a cable attachment structure. This connects the cable C to the actuator 54. In one example, the user operated input 56 is operated to move the actuator 54 with respect to the base member 52, which winds or pulls the cable C to operate the front derailleur 38A.

Figure 9:
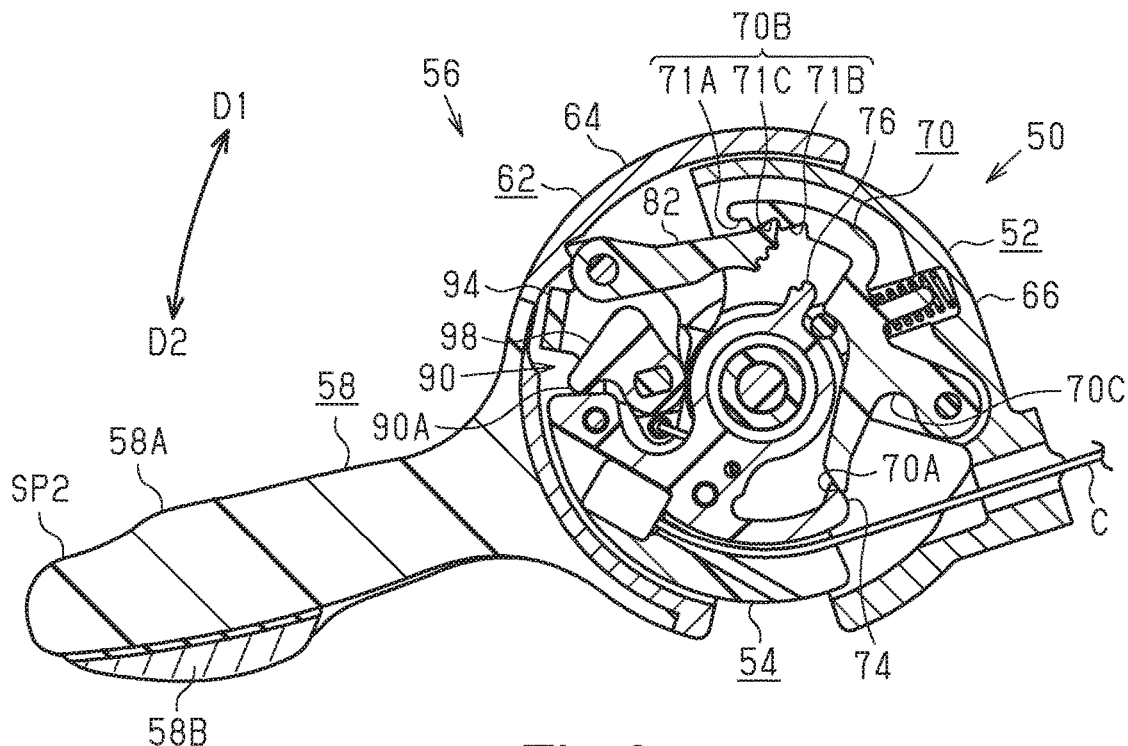
FIG. 9 is a cross-sectional view the bicycle operating device shown in FIGS. 2 and 3 in which the bicycle operating device is in a fourth state.

In a state where the actuator 54 is located in a first position P1 (refer to FIG. 6), the user operated input 56 is operated in a first direction D1 with respect to the base member 52 to move the actuator 54 from the first position P1 to a second position P2 (refer to FIG. 9). In a state where the actuator 54 is located in the second position P2, the user operated input 56 is operated in the first direction D1 to move the actuator 54 from the second position P2 to the first position P1. In a state where the actuator 54 is located in the second position P2, the user operated input 56 is operated in a second direction D2, which differs from the first direction D1, to move the actuator 54 from the second position P2 to the first position P1. The first direction D1 is opposite to the second direction D2. In one example, the first direction D1 and the second direction D2 are opposite to each other about the center axis C1 of the reference shaft 60. The first direction D1 is a clockwise direction about the center axis C1 of the reference shaft 60 in a front view of the operating device 50. The second direction D2 is a counterclockwise direction about the center axis C1 of the reference shaft 60 in a front view of the operating device 50.

The user operated input 56 is operable in the first direction D1 and the second direction D2 to be located in one of a first rest position SP1 in a state where the actuator 54 is located in the first position P1 and a second rest position SP2 (refer to FIG. 9) in a state where the actuator 54 is located in the second position P2. In one example, in a state where the actuator 54 is located in the first position P1, the user operated input 56 rests in the first rest position SP1, and in a state where the actuator 54 is located in the second position P2, the user operated input 56 rests in the second rest position SP2. In this example, the second rest position SP2 differs from the first rest position SP1.

The operating device 50 further includes a positioning member 70 that positions the actuator 54 in each of the first position P1 and the second position P2. The positioning member 70 is accommodated in the housing 62. The positioning member 70 holds the actuator 54 to maintain each of a state in which the actuator 54 is located in the first position P1 and a state in which the actuator 54 is located in the second position P2. Here, the positioning member 70 is a positioning catch or a holding catch. The operating device 50 further includes a holding shaft 72. The holding shaft 72 is parallel to the reference shaft 60. The holding shaft 72, for example, extends through the second housing part 66 and is supported by the second housing part 66. The positioning member 70 rotates about a center axis C3 of the holding shaft 72.

The operating device 50 further includes a first actuation engagement portion 74 and a second actuation engagement portion 76, which are provided to the actuator 54. The operating device 50 further includes an engagement member 80 that includes an engagement hook 82 provided to the user operated input 56. The first actuation engagement portion 74 engages with the positioning member 70. The second actuation engagement portion 76 engages with the engagement hook 82. The engagement member 80 is accommodated in the housing 62. The engagement hook 82 alternately engages with each of the second actuation engagement portion 76 and the positioning member 70. Although the detail will be described later, in a state where the user operated input 56 is located in the first rest position SP1, the engagement hook 82 engages with the second actuation engagement portion 76. In a state where the user operated input 56 is located in the second rest position SP2, the engagement hook 82 engages with the positioning member 70.

The operating device 50 further includes a first rotation shaft 88A, a second rotation shaft 88B and a linkage 90. The linkage 90 moves the engagement hook 82 with respect to the user operated input 56. The first rotation shaft 88A and the second rotation shaft 88B are parallel to the reference shaft 60. The first rotation shaft 88A, for example, extends through the first housing part 64, and is supported by the first housing part 64. The linkage 90 is accommodated in the housing 62. The linkage 90 is coupled to the first rotation shaft 88A to be rotatable about a center axis C4 of the first rotation shaft 88A. In one example, the linkage 90 is coupled to the first rotation shaft 88A to be rotatable integrally with the first rotation shaft 88A. As the user operated input 56 is operated, the first rotation shaft 88A rotates about the center axis C1 of the reference shaft 60, and the engagement member 80 and the linkage 90 also rotate about the center axis C1 of the reference shaft 60. The second rotation shaft 88B is coupled to the linkage 90. The engagement member 80 is coupled to the second rotation shaft 88B to be rotatable about a center axis C5 of the second rotation shaft 88B. In one example, the engagement hook 82 is coupled to the second rotation shaft 88B to be rotatable with respect to the linkage 90.

The linkage 90 includes a first member 94 and a second member 98. The first member 94 constitutes a first link, while the second member 98 constitutes a second link. The first member 94 couples the first rotation shaft 88A and the second rotation shaft 88B to be rotatable about the center axes C4 and C5 of the first rotation shaft 88A and the second rotation shaft 88B. The second member 98 is coupled to the first rotation shaft 88A to be rotatable integrally together with the first rotation shaft 88A. The first member 94 and the second member 98, which engage with each other, rotate integrally together about the center axis C4 of the first rotation shaft 88A. The linkage 90 further includes a contact portion 90A (refer to FIG. 9) that contacts the actuator 54 in a state where the actuator 54 is located in the second position P2. In one example, the contact portion 90A is provided to the second member 98.

Figure 4:
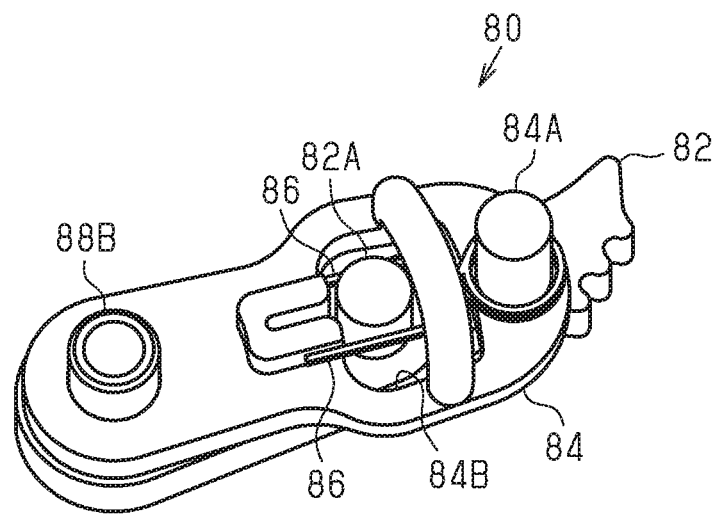
FIG. 4 is a perspective view of an engagement member of the bicycle operating device shown in FIGS. 2 and 3.

As shown in FIG. 4, the engagement member 80 further includes a holding member 84 that holds a rotation phase of the engagement hook 82 with respect to the second rotation shaft 88B and a pair of elastic members 86. In one example, the holding member 84 is coupled to the second rotation shaft 88B to be rotatable integrally with the second rotation shaft 88B. The engagement hook 82 includes a first projection 82A. The holding member 84 includes a second projection 84A and a through hole 84B through which the first projection 82A extends. The holding member 84 is arranged on the engagement hook 82 so that the first projection 82A of the engagement hook 82 extends through the through hole 84B. One example of the elastic members 86 is a single wire spring that forms both of the elastic members 86. The elastic members 86 are provided to the holding member 84 to maintain the position of the engagement hook 82 with respect to the holding member 84. Alternatively, the elastic members 86 can be other types of spring (an elastic body) or springs.

Figure 5:
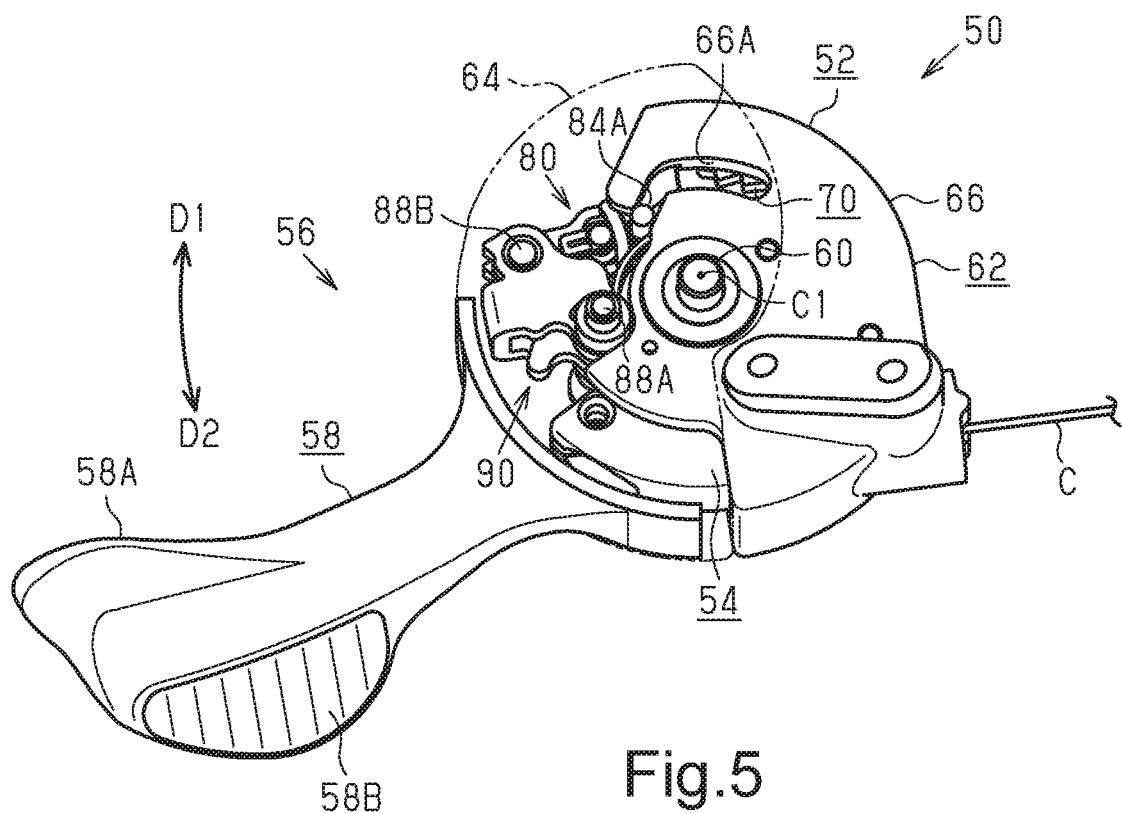
FIG. 5 is a perspective view of an internal structure of the bicycle operating device shown in FIGS. 2 and 3.

As shown in FIG. 5, the operating device 50 further includes a guide groove 66A that guides movement of the engagement member 80. The guide groove 66A is provided, for example, in the second housing part 66. In one example, the guide groove 66A is a groove through which the second projection 84A of the holding member 84 extends to guide the second projection 84A. As the user operated input 56 is operated, the engagement member 80 rotates about the center axis C1 of the reference shaft 60 so that the second projection 84A moves along the guide groove 66A.

As shown in FIG. 3, the positioning member 70 includes a first positioning portion 70A and a second positioning portion 70B. In a state where the actuator 54 is located in the second position P2, the first positioning portion 70A engages with the first actuation engagement portion 74. In a state where the actuator 54 is located in the second position P2, the second positioning portion 70B engages with the engagement hook 82. The positioning member 70 further includes a third positioning portion 70C that engages with the first actuation engagement portion 74 in a state where the actuator 54 is located in the first position P1. The third positioning portion 70C positions the actuator 54 in the first position P1 by engaging with the first actuation engagement portion 74. The first positioning portion 70A positions the actuator 54 in the second position P2 by engaging with the first actuation engagement portion 74 (refer to FIG. 9).

As the user operated input 56 is operated in the first direction D1 or the second direction D2, the positioning member 70 rotates about the center axis C3 of the holding shaft 72 in a third direction D3. More specifically, the positioning member 70 rotates in the third direction D3 by contacting the actuator 54 or the engagement hook 82. The operating device 50 further includes a restriction shaft 78. The restriction shaft 78 is parallel to the reference shaft 60. The restriction shaft 78, for example, extends through the second housing part 66, and is supported by the second housing part 66. The restriction shaft 78 restricts rotation of the positioning member 70 about the center axis C3 of the holding shaft 72 by contacting the positioning member 70. In one example, the restriction shaft 78 restricts rotation of the positioning member 70 in a fourth direction D4, which is opposite to the third direction D3.

The operating device 50 further includes a first biasing member 100 that biases the user operated input 56 with respect to the base member 52 in the second direction D2. One example of the first biasing member 100 is a torsion spring. Alternatively, the first biasing member 100 can be another type of spring (an elastic body) or springs. The first biasing member 100 is provided, for example, to couple the linkage 90 to the second housing part 66. The operating device 50 further includes a second biasing member 102 that biases the positioning member 70 in the fourth direction D4. One example of the second biasing member 102 is a coil spring. Alternatively, the second biasing member 102 can be another type of spring (an elastic body) or springs. The second biasing member 102 is provided, for example, in the second housing part 66 to push the positioning member 70 in the fourth direction D4. The operating device 50 further includes a third biasing member 104 that biases the actuator 54 with respect to the base member 52 in the second direction D2. One example of the third biasing member 104 is a torsion spring. Alternatively, the third biasing member 104 can be another type of spring (an elastic body) or springs. The third biasing member 104 is provided, for example, to couple the actuator 54 to the second housing part 66.

The first housing part 64 includes a first engagement portion 64A that engages with the second housing part 66 in a state where the actuator 54 is located in the first position P1. Here, the first engagement portion 64A is a first abutment. The second housing part 66 further includes a third engagement portion 66B that engages with the first engagement portion 64A. Here, the third engagement portion 66B is a third abutment. The engagement of the first engagement portion 64A with the third engagement portion 66B stably forms a state in which the user operated input 56 is located in the first rest position SP1. Additionally, the first housing part 64 further includes a second engagement portion 64B (refer to FIG. 6) that engages with the linkage 90. Here, the second engagement portion 64B is a second abutment. The linkage 90 further includes a fourth engagement portion 90B that engages with the second engagement portion 64B. Here, the fourth engagement portion 90B is a fourth abutment. The engagement of the second engagement portion 64B with the fourth engagement portion 90B restricts the rotation of the linkage 90 about the center axis C4 of the second rotation shaft 88B, which is caused by the first biasing member 100. Additionally, the engagement of the second engagement portion 64B with the fourth engagement portion 90B stably forms a state in which the user operated input 56 is biased by the first biasing member 100 in the second direction D2.

Figure 10:
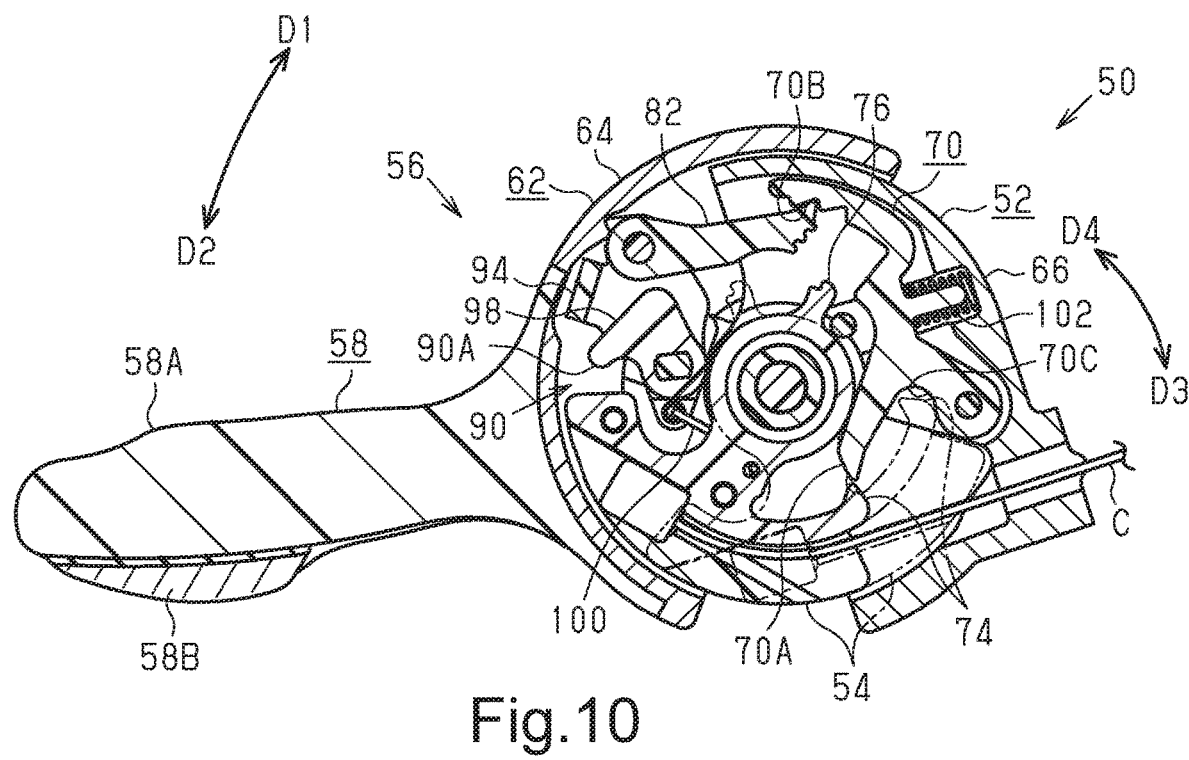
FIG. 10 is a cross-sectional view of the bicycle operating device shown in FIGS. 2 and 3 in which the bicycle operating device is in a fifth state.
Figure 11:
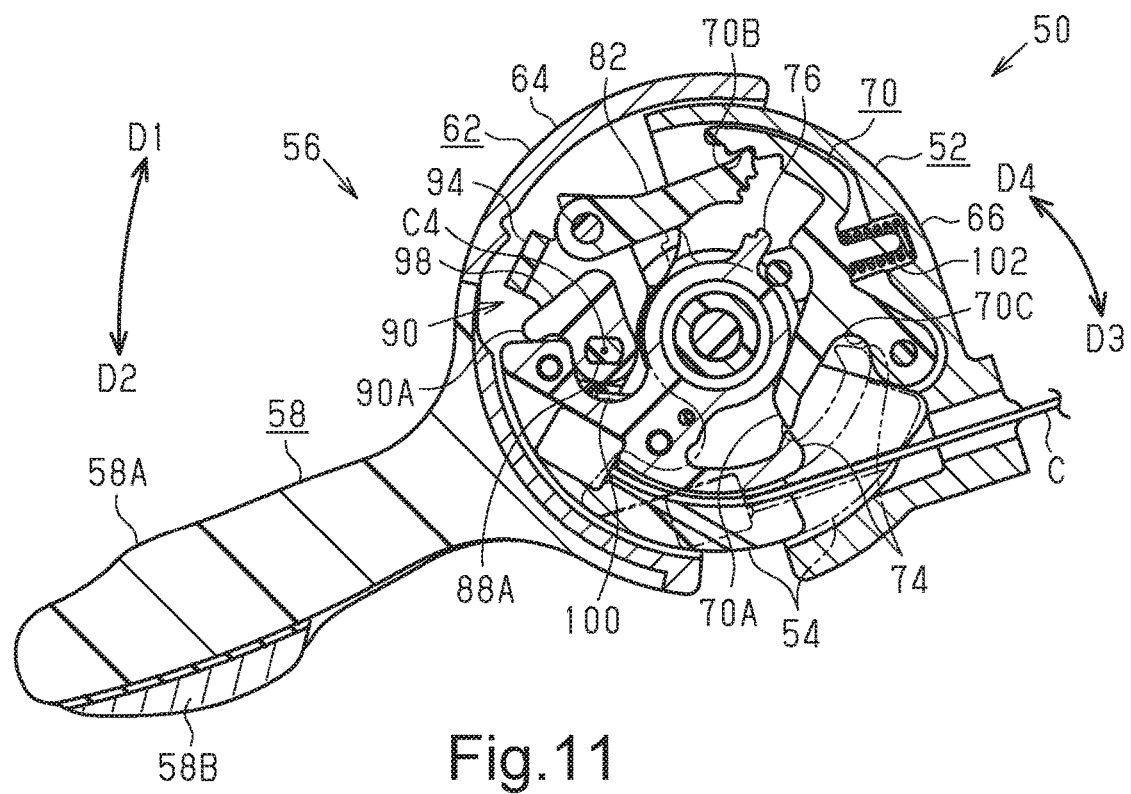
FIG. 11 is a cross-sectional view of the bicycle operating device shown in FIGS. 2 and 3 in which the bicycle operating device is in a sixth state.

The operation of the operating device 50 will now be described with reference to FIGS. 6 to 11. The operating device 50 is operated, for example, by the rider of the bicycle 10 as follows. In a first route, the operating device 50 is operated in the order of a first state (FIG. 6), a second state (FIG. 7), a third state (FIG. 8), a fourth state (FIG. 9) and a fifth state (FIG. 10). In a second route, the operating device 50 is operated in the order of the first state (FIG. 6), the second state (FIG. 7), the third state (FIG. 8), the fourth state (FIG. 9) and a sixth state (FIG. 11).

FIG. 6 shows the first state in which the user operated input 56 is located in the first rest position SP1 and the actuator 54 is located in the first position P1. In the first state, the user operated input 56 is rotated farthest in the second direction D2. In the first state, the first actuation engagement portion 74 engages with the third positioning portion 70C, the engagement hook 82 engages with the second actuation engagement portion 76, the first engagement portion 64A engages with the third engagement portion 66B, and the second engagement portion 64B engages with the fourth engagement portion 90B. In a state where the actuator 54 is located in the first position P1, the user operated input 56 is operated in the first direction D1 to disengage the first actuation engagement portion 74 from the third positioning portion 70C. In a state where the actuator 54 is located in the first position P1, the engagement hook 82 engages with the second actuation engagement portion 76. As the user operated input 56 is operated in the first direction D1, the engagement hook 82 moves the actuator 54 in the first direction D1. More specifically, as the user operated input 56 is operated in the first direction D1, the second actuation engagement portion 76 is pushed by the engagement hook 82 so that the actuator 54 rotates in the first direction D1.

Figure 7:
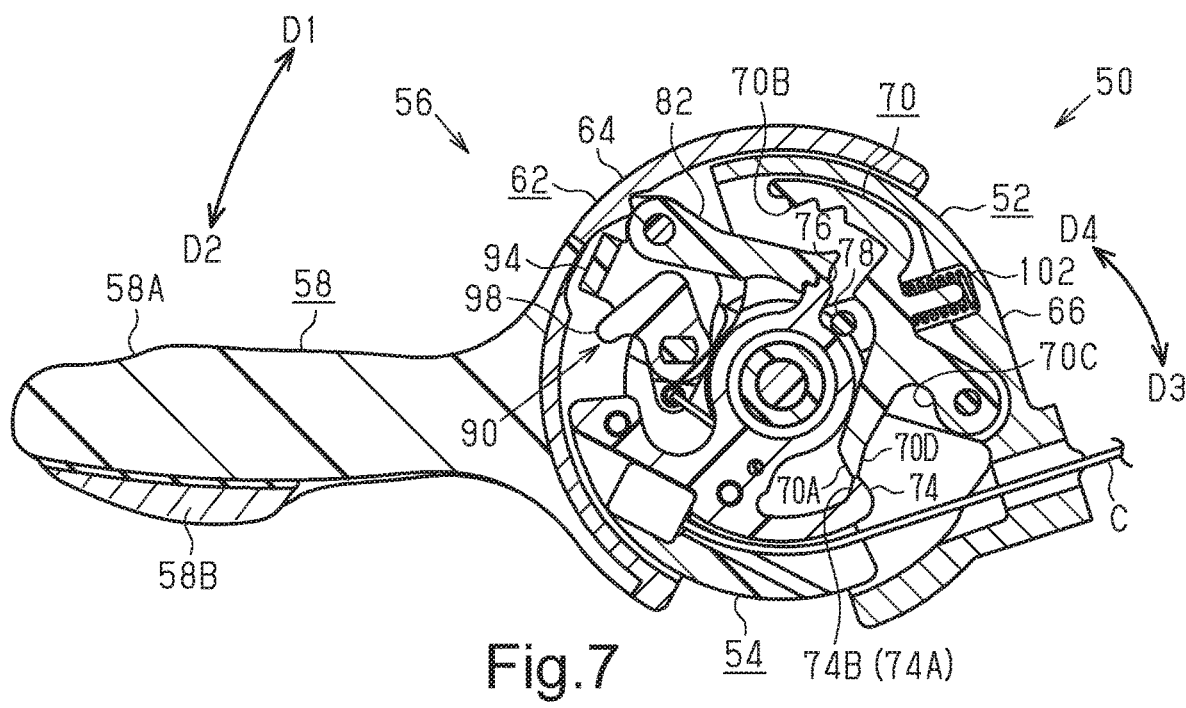
FIG. 7 is a cross-sectional view of the bicycle operating device shown in FIGS. 2 and 3 in which the bicycle operating device is in a second state.

FIG. 7 shows the second state in which the user operated input 56 is operated in the first direction D1, and the positioning member 70 is moved. The positioning member 70 has a positioning position PP and a release position PR, which differs from the positioning position PP. An operation of the user operated input 56 moves the positioning member 70 from the positioning position PP to the release position PR. In a case where the positioning member 70 is located in the positioning position PP, the positioning member 70 is in contact with the restriction shaft 78 (refer to FIG. 6). In a case where the positioning member 70 is located in the release position PR, the positioning member 70 is separated from the restriction shaft 78 against the biasing force of the second biasing member 102. In the second state, the first actuation engagement portion 74 is in contact with the first positioning portion 70A. More specifically, an end surface 74A of the first actuation engagement portion 74, which is located at the side of the first direction D1, is in contact with an end surface 70D of the first positioning portion 70A, which is located at the side of the second direction D2. In the second state, the end surface 74A of the first actuation engagement portion 74, which is located at the side of the first direction D1, defines a cam surface 74B, and the end surface 70D of the first positioning portion 70A, which is located at the side of the second direction D2, is movable along the cam surface 74B of the first actuation engagement portion 74. As the first positioning portion 70A moves along the cam surface 74B of the first actuation engagement portion 74 against the biasing force of the second biasing member 102, the positioning member 70 rotates in the third direction D3 and moves from the positioning position PP to the release position PR. Release of the first actuation engagement portion 74 from the first positioning portion 70A allows a continuous operation of the user operated input 56 in the first direction D1.

Figure 8:
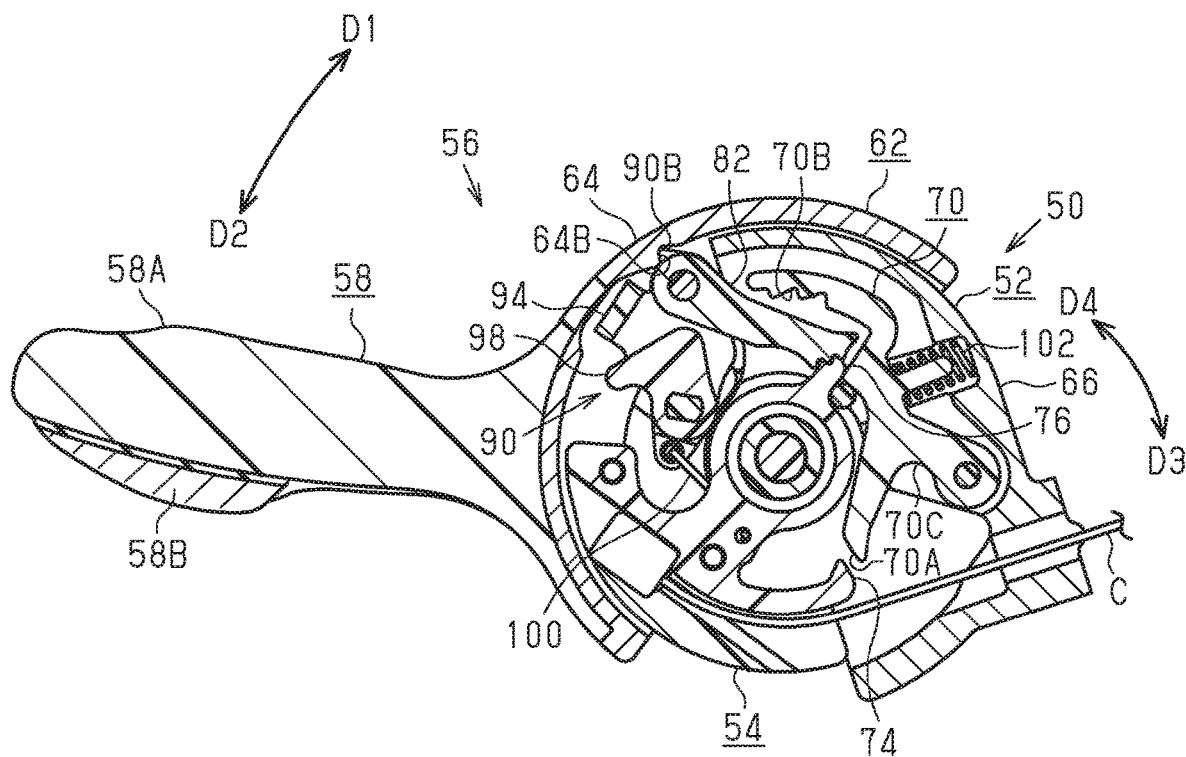
FIG. 8 is a cross-sectional view the bicycle operating device shown in FIGS. 2 and 3 in which the bicycle operating device is in a third state.

FIG. 8 shows the third state in which the user operated input 56 is operated in the first direction D1 and the second actuation engagement portion 76 is in contact with the positioning member 70. In the third state, the user operated input 56 is rotated farthest the first direction D1. From the first state to the third state, the state in which the engagement hook 82 is engaged with the second actuation engagement portion 76 and the state in which the second engagement portion 64B is engaged with the fourth engagement portion 90B are maintained. Thus, the actuator 54 and the user operated input 56 rotate integrally with each other with respect to the base member 52. In the third state, contact of the second actuation engagement portion 76 with the positioning member 70 restricts rotation of the actuator 54 and the user operated input 56 in the first direction D1. In the third state, the first actuation engagement portion 74 is released from the first positioning portion 70A. Thus, the positioning member 70 is rotated by the second biasing member 102 in the fourth direction D4, and the positioning member 70 is moved to the positioning position PP. In one example, in a case where the operating device 50 reaches the third state, the rider releases the input to the operating portion 58 in the first direction D1 so that the user operated input 56 will not be operated. As a result, the actuator 54 and the user operated input 56 are rotated by the first biasing member 100 and the third biasing member 104 in the second direction D2.

FIG. 9 shows the fourth state in which the user operated input 56 is located in the second rest position SP2 and the actuator 54 is located in the second position P2. In the fourth state, engagement of the first actuation engagement portion 74 with the first positioning portion 70A restricts rotation of the actuator 54 in the second direction D2. In the fourth state, engagement of the contact portion 90A of the linkage 90 with the actuator 54 restricts rotation of the user operated input 56 in the second direction D2. Additionally, engagement of the first actuation engagement portion 74 with the first positioning portion 70A disengages the engagement hook 82 from the second actuation engagement portion 76, and the rotation phase of the engagement hook 82 with respect to the second rotation shaft 88B is returned to an appropriate rotation phase by the elastic members 86. In one example, the user operated input 56 rotates in the second direction D2 until the contact portion 90A of the linkage 90 engages with the actuator 54. The engagement of the contact portion 90A of the linkage 90 with the actuator 54 engages the engagement hook 82 with the second positioning portion 70B. Thus, the operating device 50 forms the fourth state. In one example, after the first actuation engagement portion 74 engages with the first positioning portion 70A, the contact portion 90A of the linkage 90 engages with the actuator 54. In other words, after the actuator 54 is located in the second position P2, the user operated input 56 is located in the second rest position SP2. In one example, the operating device 50 pulls the cable C in the process of operations from the first state to the fourth state. In one example, the front derailleur 38A is driven to change the transmission ratio of the bicycle 10 in the process of operations of the operating device 50 from the first state to the fourth state.

FIG. 10 shows the fifth state in which the user operated input 56 is operated in the first direction D1 from a state in which the actuator 54 is located in the second position P2, and the first actuation engagement portion 74 is disengaged from the first positioning portion 70A. In a state where the actuator 54 is located in the second position P2, if the user operated input 56 is operated in the first direction D1, the engagement hook 82 moves the positioning member 70 with respect to the base member 52 so that the first actuation engagement portion 74 disengages from the first positioning portion 70A. In the fifth state, in a state where the actuator 54 is located in the second position P2, if the user operated input 56 is operated in the first direction D1, the contact portion 90A of the linkage 90 disengages from the actuator 54, and the engagement hook 82 pushes the second positioning portion 70B. This rotates the positioning member 70 in the third direction D3. Movement of the positioning member 70 from the positioning position PP to the release position PR disengages the first actuation engagement portion 74 from the first positioning portion 70A. Accordingly, the actuator 54 is rotated by the third biasing member 104 in the second direction D2, and the first actuation engagement portion 74 engages with the third positioning portion 70C. The double-dashed line in FIG. 10 shows a state in which the first actuation engagement portion 74 is engaged with the third positioning portion 70C.

In a case where the operating device 50 reaches the fifth state, the rider releases the input to the operating portion 58 in the first direction D1 so that the user operated input 56 will not be operated. As a result, the user operated input 56 is rotated by the first biasing member 100 in the second direction D2, and the positioning member 70 is rotated by the second biasing member 102 in the fourth direction D4. Thus, the operating device 50 forms the first state (refer to FIG. 6). In one example, in a case where the operating device 50 reaches the fifth state, the actuator 54 returns to the first position P1 independently from the operation of the rider reducing the input to the operating portion 58 in the first direction D1 so that the user operated input 56 will not be operated. In one example, the operating device 50 releases the cable C in the process of operations from the fourth state via the fifth state to the first state. In one example, the front derailleur 38A is operated to change the transmission ratio of the bicycle 10 in the process of operations of the operating device 50 from the fourth state via the fifth state to the first state.

FIG. 11 shows the sixth state in which the user operated input 56 is operated in the second direction D2 from a state in which the actuator 54 is located in the second position P2, and the first actuation engagement portion 74 is disengaged from the first positioning portion 70A. In a state the actuator 54 is located in the second position P2, if the user operated input 56 is operated in the second direction D2, the engagement hook 82 moves the positioning member 70 with respect to the base member 52 so that the first actuation engagement portion 74 is disengaged from the first positioning portion 70A. The linkage 90 moves the engagement hook 82 with respect to the user operated input 56 so that the first actuation engagement portion 74 is disengaged from the first positioning portion 70A. In the sixth state, in a state where the actuator 54 is located in the second position P2, if the user operated input 56 is operated in the second direction D2, the contact portion 90A of the linkage 90 is forced against the actuator 54. Reaction force produced in the contact portion 90A by the contact with the actuator 54 is transferred to the engagement hook 82.

More specifically, in a state where the actuator 54 is located in the second position P2, if the user operated input 56 is operated in the second direction D2, the user operated input 56 starts to move with respect to the actuator 54 in the second direction D2 due to the engagement of the first actuation engagement portion 74 with the first positioning portion 70A. At this time, the contact portion 90A of the linkage 90 is coupled to the user operated input 56 by the first rotation shaft 88A, and the actuator 54 restricts movement of the contact portion 90A of the linkage 90 in the second direction D2. Therefore, as the user operated input 56 starts to move with respect to the actuator 54 in the second direction D2, the contact portion 90A of the linkage 90 receives reaction force from the actuator 54 in the first direction D1. The reaction force from the actuator 54 rotates the linkage 90 about the center axis C4 of the first rotation shaft 88A. As the linkage 90 rotates about the center axis C4, the engagement hook 82 pushes the second positioning portion 70B, thereby rotating the positioning member 70 in the third direction D3. Movement of the positioning member 70 from the positioning position PP to the release position PR disengages the first actuation engagement portion 74 from the first positioning portion 70A. Accordingly, the third biasing member 104 rotates the actuator 54 in the second direction D2, and the first actuation engagement portion 74 engages with the third positioning portion 70C. The double-dashed line in FIG. 11 shows a state in which the first actuation engagement portion 74 is engaged with the third positioning portion 70C.

In a case where the operating device 50 reaches the sixth state, the first biasing member 100 rotates the user operated input 56 in the second direction D2, and the second biasing member 102 rotates the positioning member 70 in the fourth direction D4 regardless of whether or not the rider continues the input to the operating portion 58 in the second direction D2 so that the user operated input 56 will not be operated. Thus, the operating device 50 forms the first state (refer to FIG. 6). In one example, in a case where the operating device 50 reaches the sixth state, the actuator 54 returns to the first position P1 independently from operation of the user operated input 56. In one example, the operating device 50 releases the cable C in the process of operations from the fourth state via the sixth state to the first state. In one example, the front derailleur 38A is operated to change the transmission ratio of the bicycle 10 in the process of operations of the operating device 50 from the fourth state via the sixth state to the first state.

Figure 12:
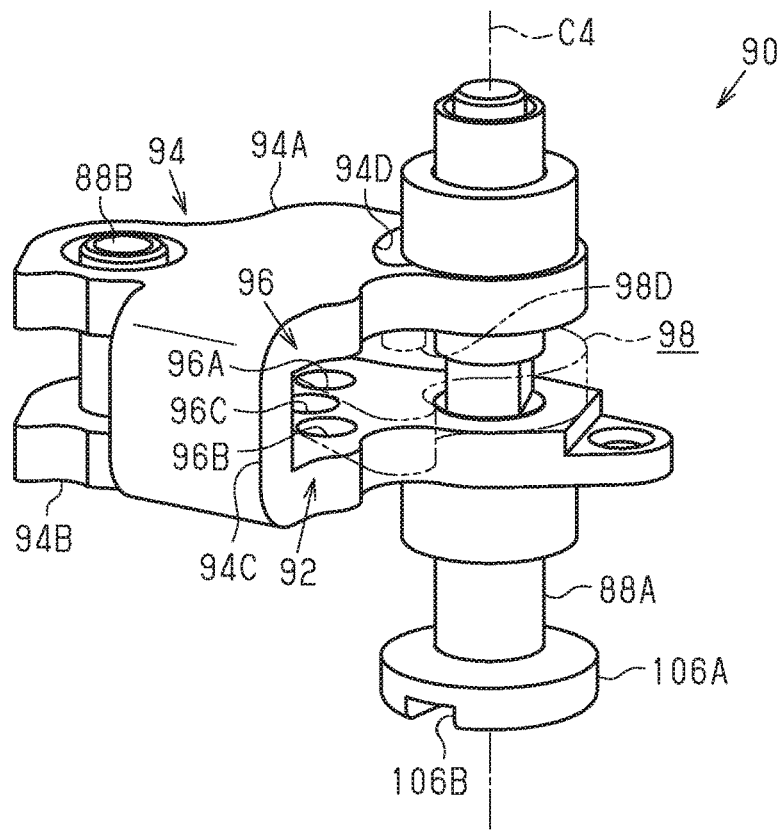
FIG. 12 is a perspective view of a linkage and selected surrounding parts of the bicycle operating device shown in FIGS. 2 and 3.

The specific structure of the linkage 90 will now be described with reference to FIGS. 12 and 13. As shown in FIG. 12, the linkage 90 of the operating device 50 further includes a position adjuster 92 configured to adjust the second rest position SP2 with respect to the first rest position SP1. The position adjuster mechanism 92 is configured to adjust the second rest position SP2 so that the second rest position SP2 is located in any one of a plurality of adjustment positions RP1 to RP3. The plurality of adjustment positions RP1 to RP3 includes a first adjustment position RP1, a second adjustment position RP2, and a third adjustment position RP3 (refer to FIG. 14). A rest position interval SPD, which is the distance between the first rest position SP1 and the second rest position SP2, is shortest at the first adjustment position RP1. In one example, the rest position interval SPD is a distance between a top 56A of the user operated input 56 located in the first rest position SP1 and the top 56A of the user operated input 56 located in the second rest position SP2 (refer to FIG. 14). The rest position interval SPD is longest at the second adjustment position RP2. The rest position interval SPD is longer at the third adjustment position RP3 than at the first adjustment position RP1 and shorter than at the second adjustment position RP2.

Figure 14:
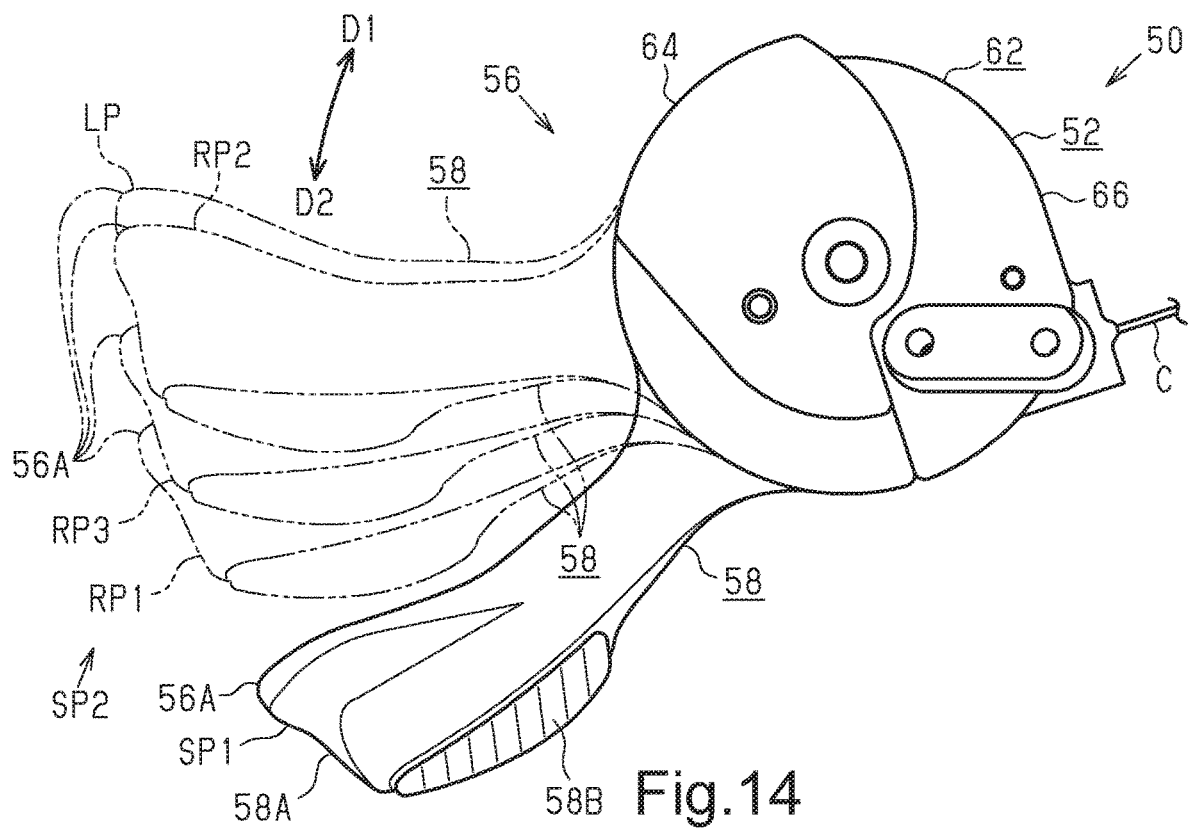
FIG. 14 is a top view of the bicycle operating device shown in FIGS. 2 and 3 and showing various second rest positions of a user operated input of the bicycle operating device shown in dashed lines.

In the process of operations of the operating device 50 from the third state (refer to FIG. 8) to the fourth state (refer to FIG. 9), in a state where the actuator 54 is moved to the second position P2, the user operated input 56 is located in a user operated input position LP (refer to FIG. 14). The user operated input position LP is located at the side of the first direction D1 with respect to the second rest position SP2. In one example, the position adjuster 92 is configured to adjust the second rest position SP2 with respect to the user operated input position LP. A movement distance MD, which is a distance between the user operated input position LP and the second rest position SP2, is longest at the first adjustment position RP1. In one example, the movement distance MD is the distance between the top 56A of the user operated input 56 located in the user operated input position LP and the top 56A of the user operated input 56 located in the second rest position SP2 (refer to FIG. 1). The movement distance MD is shortest at the second adjustment position RP2. The movement distance MD is shorter at the third adjustment position RP3 than at the first adjustment position RP1 and longer than at the second adjustment position RP2.

Here, the position adjuster 92 is provided, for example, to the linkage 90. The position adjuster 92 includes the first member 94 (first link) and the second member 98 (the second link), which are provided to the user operated input 56. The first member 94 includes a first part 94A, a second part 94B and a third part 94C. The first part 94A and the second part 94B face each other. The third part 94C connects the first part 94A and the second part 94B to be continuous with the first part 94A and the second part 94B. The first member 94 further includes a plurality of first adjustment engagement portions 96 respectively corresponding to the plurality of adjustment positions RP1 to RP3. The plurality of first adjustment engagement portions 96 is arranged, for example, in the second part 94B around the center axis C4 of the first rotation shaft 88A. The plurality of first adjustment engagement portions 96 includes a first adjustment engagement hole 96A, a second adjustment engagement hole 96B and a third adjustment engagement hole 96C. The first adjustment engagement hole 96A corresponds to the first adjustment position RP1 and is located at a position farthest from the actuator 54. The second adjustment engagement hole 96B corresponds to the second adjustment position RP2 and is located at a position closest to the actuator 54. The third adjustment engagement hole 96C corresponds to the third adjustment position RP3 and is located between the first adjustment engagement hole 96A and the second adjustment engagement hole 96B.

Figure 13:
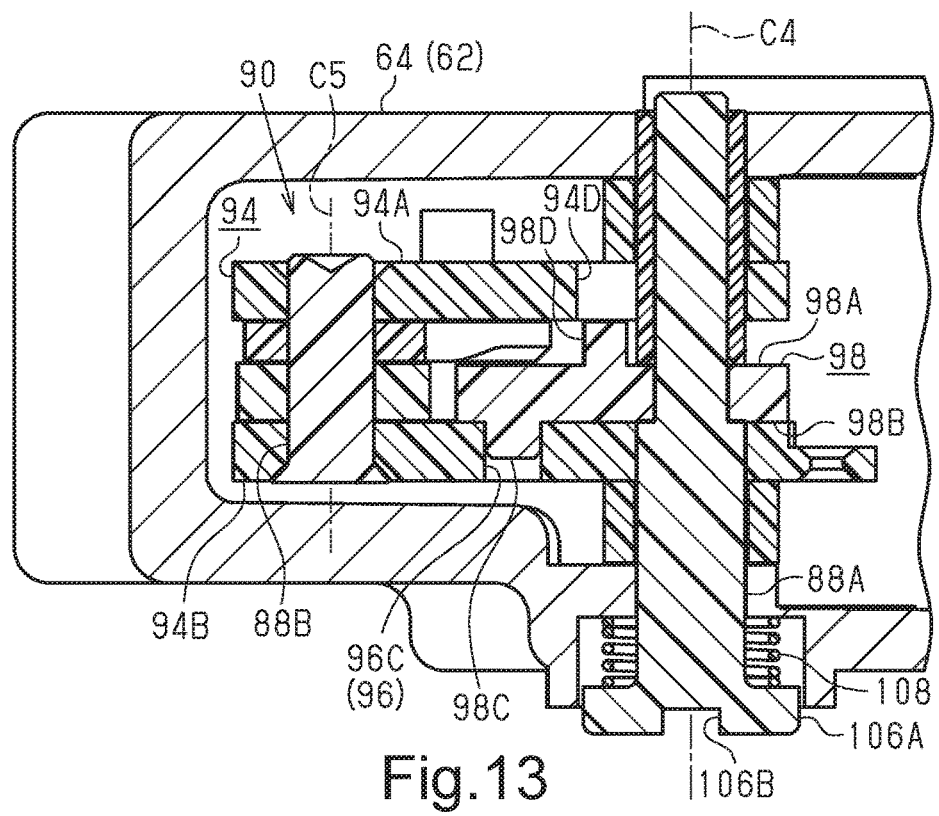
FIG. 13 is a cross-sectional view of the linkage and selected surrounding parts of the bicycle operating device shown in FIG. 3.

As shown in FIG. 13, the second member 98 includes a first surface 98A facing the first part 94A of the first member 94 and a second surface 98B facing the second part 94B of the first member 94. The second member 98 further includes a second adjustment engagement portion 98C that engages with each of the plurality of first adjustment engagement portions 96. The second adjustment engagement portion 98C is a pin that is insertable into each of the adjustment engagement holes 96A to 96C. The second adjustment engagement portion 98C is provided, for example, on the second surface 98B of the second member 98. In one example, in a case where the second adjustment engagement portion 98C engages with the first adjustment engagement hole 96A, the second rest position SP2 is located at the first adjustment position RP1. In a case where the second adjustment engagement portion 98C engages with the second adjustment engagement hole 96B, the second rest position SP2 is located at the second adjustment position RP2. In a case where the second adjustment engagement portion 98C engages with the third adjustment engagement hole 96C, the second rest position SP2 is located at the third adjustment position RP3. Changes in the relationship between the first adjustment engagement portions 96 and the second adjustment engagement portion 98C change the rotation phase of the second member 98 with respect to the first member 94 about the center axis C4 of the first rotation shaft 88A. FIGS. 12 and 13 show the state in which the second adjustment engagement portion 98C is engaged with the third adjustment engagement hole 96C.

For example, the first rotation shaft 88A is operated to set the location of the second rest position SP2. More specifically, a tool is inserted into a tool engagement portion 106B provided in a head 106A of the first rotation shaft 88A, and the head 106A of the first rotation shaft 88A is forced into the first housing part 64 to disengage the first adjustment engagement portions 96 from the second adjustment engagement portion 98C. Then, the first rotation shaft 88A is rotated so that the second adjustment engagement portion 98C is located above the desired one of the first adjustment engagement portions 96. The first rotation shaft 88A is returned to the former state by a fourth biasing member 108 that biases the first rotation shaft 88A toward the head 106A.

Here, the fourth biasing member 108 is a coil compression spring. Alternatively, the fourth biasing member 108 can be another type of spring (an elastic body) or springs such as a Belleville washer or a rubber washer. As a result, the second adjustment engagement portion 98C engages with the desired one of the first adjustment engagement portions 96, and the location of the second rest position SP2 is set.

The second member 98 further includes a restriction pin 98D that restricts rotation of the first rotation shaft 88A in the process of setting the location of the second rest position SP2. The restriction pin 98D is provided, for example, on the first surface 98A of the second member 98. The first member 94 further includes a restriction groove 94D into which the restriction pin 98D is inserted. The restriction groove 94D is provided, for example, in the first part 94A of the first member 94. In one example, as the head 106A of the first rotation shaft 88A is forced into the first housing part 64, the restriction pin 98D is inserted into the restriction groove 94D. In a case where the first rotation shaft 88A is operated to rotate, the restriction pin 98D is movable in the range of the restriction groove 94D. FIG. 13 shows a cross section of the linkage 90 that is cut through the first rotation shaft 88A, the restriction pin 98D, the second adjustment engagement portion 98C, and the second rotation shaft 88B and its surroundings.

As shown in FIG. 14, in a state where the actuator 54 is located in the second position P2, the second rest position SP2 is located at one of the first adjustment position RP1, the second adjustment position RP2, and the third adjustment position RP3. The double-dashed lines in FIG. 14 show the plurality of adjustment positions RP1 to RP3. The plurality of adjustment positions RP1 to RP3 differs in the relationship between the engagement hook 82 and the second positioning portion 70B in a state where the actuator 54 is located in the second position P2. The examples shown in FIGS. 3 to 11 show the state in which the second adjustment engagement portion 98C is engaged with the third adjustment engagement hole 96C.

As shown in FIG. 9, the second positioning portion 70B includes a plurality of positioning engagement portions 71A to 71C. The plurality of positioning engagement portions 71A to 71C includes a first positioning engagement portion 71A corresponding to the first adjustment position RP1, a second positioning engagement portion 71B corresponding to the second adjustment position RP2, and a third positioning engagement portion 71C provided between the first positioning engagement portion 71A and the second positioning engagement portion 71B and corresponding to the third adjustment position RP3. In the example shown in FIG. 9, the engagement of the contact portion 90A of the linkage 90 with the actuator 54 engages the engagement hook 82 with the third positioning engagement portion 71C of the second positioning portion 70B. Thus, in a state where the actuator 54 is located in the second position P2, the second rest position SP2 is located at the third adjustment position RP3.

Figure 15:
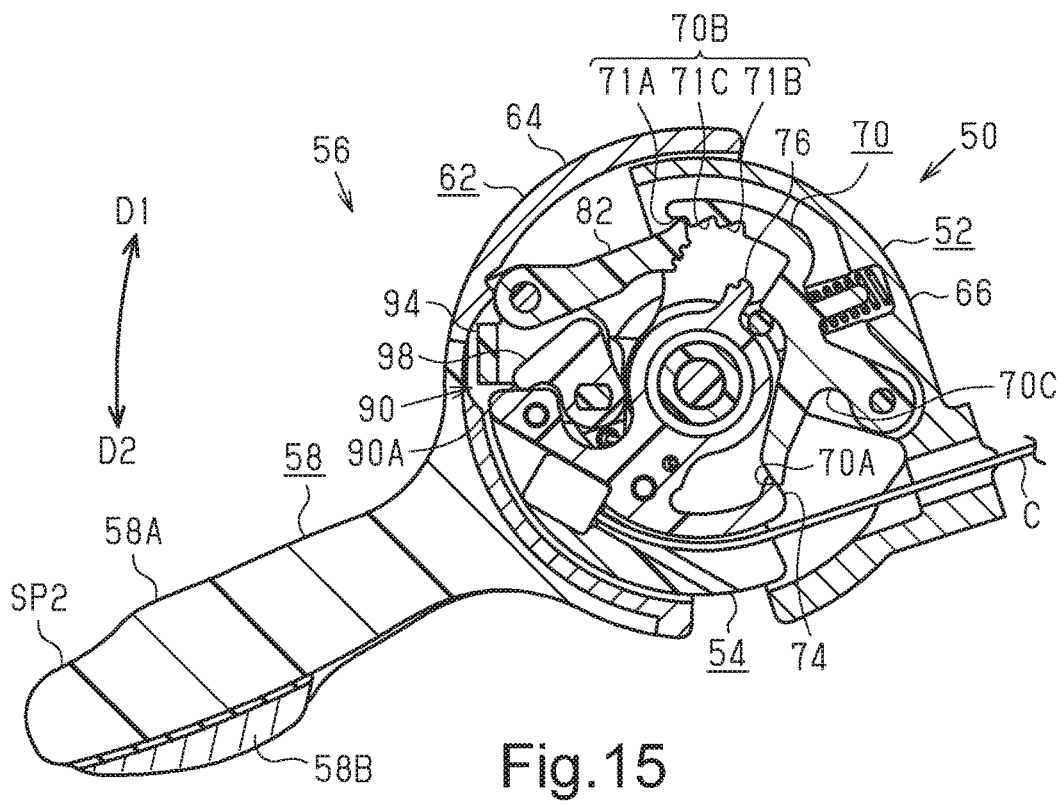
FIG. 15 is a cross-sectional view, similar to FIG. 9, of the bicycle operating device shown in FIGS. 2 and 3, but with the second rest position located at a first adjustment position.

FIG. 15 shows a state in which the second adjustment engagement portion 98C is engaged with the first adjustment engagement hole 96A in the fourth state, in which the user operated input 56 is located in the second rest position SP2 and the actuator 54 is located in the second position P2. In the example shown in FIG. 15, the engagement of the contact portion 90A of the linkage 90 with the actuator 54 engages the engagement hook 82 with the first positioning engagement portion 71A of the second positioning portion 70B. Thus, in a state where the actuator 54 is located in the second position P2, the second rest position SP2 is located at the first adjustment position RP1.

Figure 16:
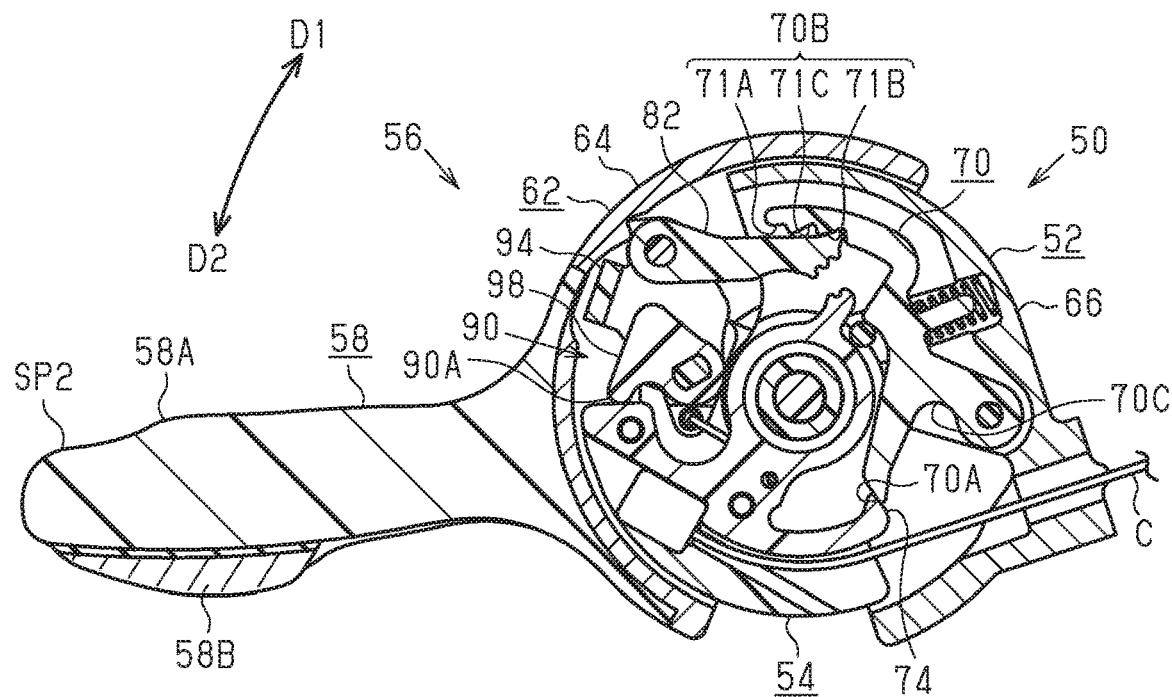
FIG. 16 is a cross-sectional view similar to FIG. 9, of the bicycle operating device shown in FIGS. 2 and 3, but with the second rest position located at a second adjustment position.

FIG. 16 shows a state in which the second adjustment engagement portion 98C is engaged with the second adjustment engagement hole 96B in the fourth state, in which the user operated input 56 is located in the second rest position SP2 and the actuator 54 is located in the second position P2. In the example shown in FIG. 16, the engagement of the contact portion 90A of the linkage 90 with the actuator 54 engages the engagement hook 82 with the second positioning engagement portion 71B of the second positioning portion 70B. Thus, in a state where the actuator 54 is located in the second position P2, the second rest position SP2 is located at the second adjustment position RP2.

Second Embodiment

A second embodiment of an operating device 150 will now be described with reference to FIGS. 17 and 18. The same reference characters are given to those parts that are the same as the corresponding parts of the first embodiment. Such parts will not be described in detail.

Figure 17:
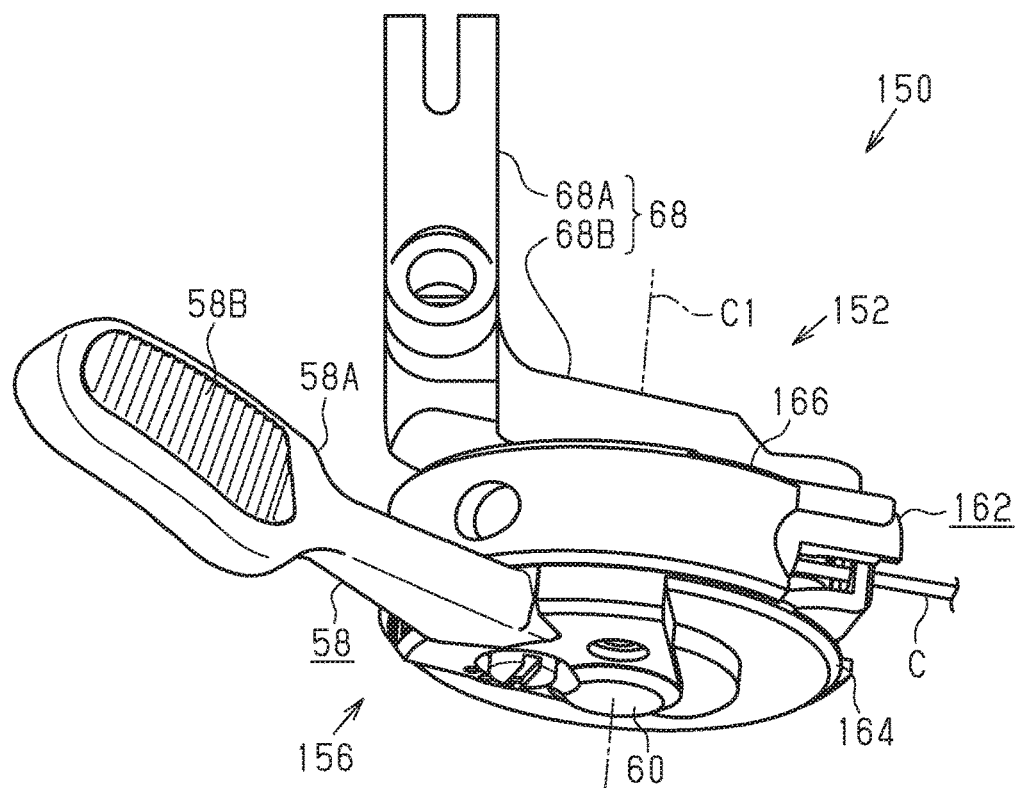
FIG. 17 is a perspective view of a bicycle operating device in accordance with a second embodiment.
Figure 18:
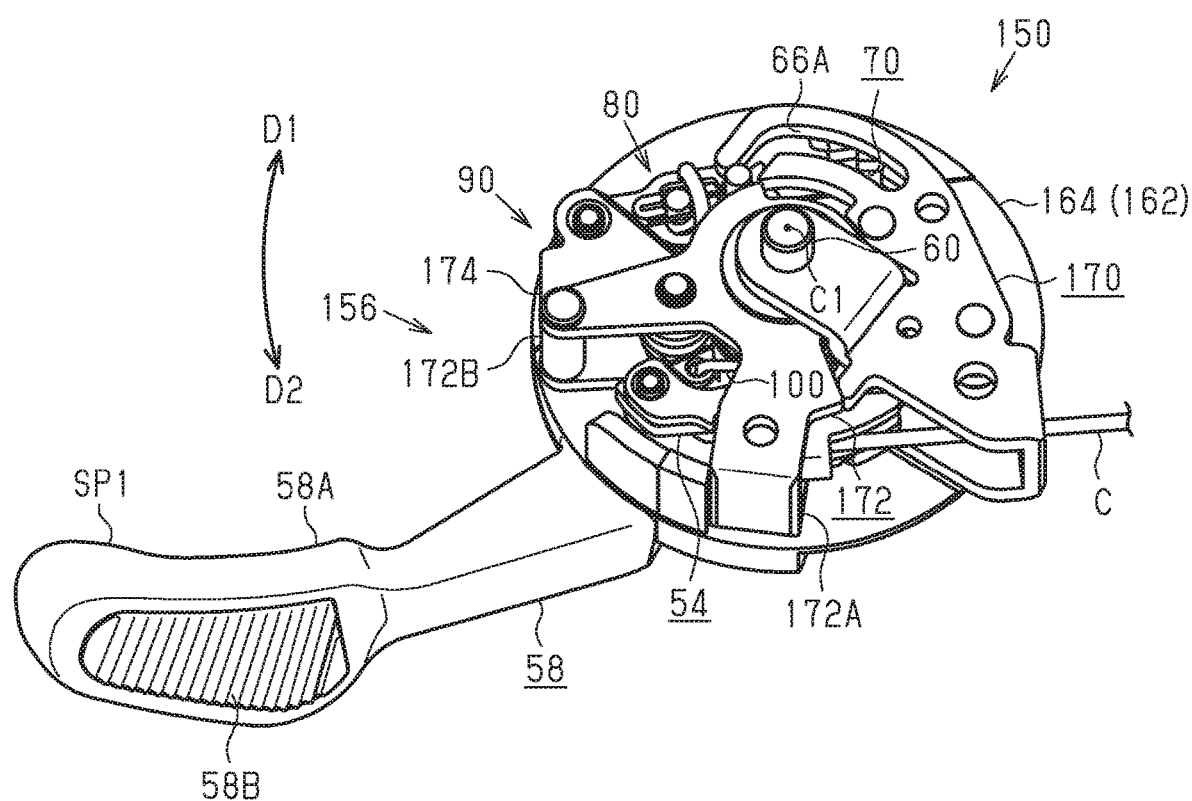
FIG. 18 is a perspective view of an internal structure of the bicycle operating device shown in FIG. 17.

As shown in FIGS. 17 and 18, the operating device 150 includes a base member 152, the actuator 54 (refer to FIG. 18) of the first embodiment and a user operated input 156. The actuator 54 is arranged to be movable with respect to the base member 152 and connected to the cable C of the bicycle component 36. The user operated input 156 is arranged to be movable with respect to the base member 152 to move the actuator 54. The actuator 54 and the user operated input 156 rotate with respect to the base member 152 about the center axis C1 of the reference shaft 60.

The operating device 150 further includes a housing 162 that accommodates the actuator 54. One example of the material of the housing 162 is a resin material. The housing 162 includes a first housing part 164 and a second housing part 166. With the housing 162 separated into pieces in a direction along the center axis C1 of the reference shaft 60, the first housing part 164 is one of the pieces of the housing 162, while the second housing part 166 is the other piece of the housing 162. In one example, the second housing part 166 is arranged to cover a part of the first housing part 164. The first housing part 164 is rotatable with respect to the second housing part 166.

The base member 152 includes the second housing part 166 and the bicycle attachment 68. The bicycle attachment 68 is provided to the second housing part 166. The user operated input 156 includes the first housing part 164 and the operating portion 58 provided to the first housing part 164. The operating portion 58 is integral with or separate from the first housing part 164. The user operated input 156 is operable in the first direction D1 and the second direction D2 and moves the actuator 54 in the same manner as the first embodiment of the user operated input 56.

As shown in FIG. 18, the operating device 150 further includes a guide member 170 that guides movement of the engagement member 80 and a support member 172 that supports the linkage 90. The guide member 170 is separate from the housing 162. In one example, the guide member 170 is fixed to the reference shaft 60 so as not to move with respect to the second housing part 166. In other words, the guide member 170 is fixed so as not to move with respect to the base member 152. The guide member 170 includes the guide groove 66A. One example of the material of the guide member 170 is a metal material.

The support member 172 is provided to the first housing part 164 to be rotatable about the center axis C1 of the reference shaft 60. In one example, the support member 172 is fixed to the first housing part 164. The support member 172 moves together with the user operated input 156 with respect to the base member 152. The support member 172 includes a first engagement portion 172A that engages with the second housing part 166 in a state where the actuator 54 is located in the first position P1 and a second engagement portion 172B that engages with the linkage 90. The engagement of the first engagement portion 172A with the second housing part 166 stably forms a state in which the user operated input 156 is located in the first rest position SP1. The linkage 90 further includes a fourth engagement portion 174 that engages with the second engagement portion 172B. In a state where the second engagement portion 172B is engaged with the fourth engagement portion 174, the first biasing member 100 biases the user operated input 156 in the second direction D2.

Modifications

The description related to the above embodiments exemplifies, without any intention to limit, applicable forms of a bicycle operating device according to the present invention. The bicycle operating device according to the present invention can be applicable to modifications of the above embodiments that are described below and combinations of two or more of the modifications that do not contradict each other. In the modifications described below, the same reference characters are given to those parts that are the same as the corresponding parts of the embodiments. Such parts will not be described in detail.

The relationship between the first adjustment engagement portions 96 and the second adjustment engagement portion 98C can be changed in any manner. In one example, the first adjustment engagement portions 96 are pins, and the second adjustment engagement portion 98C are holes. The number of first adjustment engagement portions 96 can be changed in any manner. In a first example, one of the first adjustment engagement hole 96A, the second adjustment engagement hole 96B, and the third adjustment engagement hole 96C is omitted from the plurality of first adjustment engagement portions 96. In a second example, the plurality of first adjustment engagement portions 96 includes one or more adjustment engagement holes in addition to the first adjustment engagement hole 96A, the second adjustment engagement hole 96B, and the third adjustment engagement hole 96C. In a third example, at least two of the first adjustment engagement hole 96A, the second adjustment engagement hole 96B, and the third adjustment engagement hole 96C are omitted from the first adjustment engagement portions 96. In one example, the first adjustment engagement portions 96 are omitted from the first member 94, and the second adjustment engagement portion 98C is omitted from the second member 98. More specifically, the position adjuster 92 is omitted from the operating devices 50 and 150.

The second rest position SP2 and the first rest position SP1 may be located at the same position. The structure of the positioning member 70 can be changed in any manner. In one example, the third positioning portion 70C is omitted from the positioning member 70. In this example, in a state where the actuator 54 is located in the first position P1, the first actuation engagement portion 74 of the actuator 54 engages with the second housings 66 and 166.

The operating devices 50 and 150 can have a form from which the reference shaft 60 is omitted. In this example, the actuator 54 and the user operated inputs 56 and 156 slide with respect to the base members 52 and 152. The operating devices 50 and 150 can have a form from which the holding shaft 72 is omitted. In a first example, the positioning member 70 slides with respect to the base members 52 and 152. In a second example, the positioning member 70 is fixed to the base members 52 and 152.

The relationship between the first distance L1 and the second distance L2 can be changed in any manner. In a first example, the first distance L1 is longer than the second distance L2. In a second example, the first distance L1 and the second distance L2 have substantially the same length. In this example, the bicycle attachment 68 is provided to the housings 62 and 162 so that the facing surface 62A of the housings 62 and 162 is substantially parallel to the center axis C2 of the handlebar 18 in the mounted state.

The configuration of the user operated inputs 56 and 156 can be changed in any manner. In a first example, in a state where the actuator 54 is located in the second position P2, an operation of the user operated inputs 56 and 156 in the first direction D1 moves the actuator 54 from the second position P2 to the first position P1. In this example, an operation of the user operated inputs 56 and 156 in the second direction D2 does not move the actuator 54. In a second example, in a state where the actuator 54 is located in the second position P2, an operation of the user operated inputs 56 and 156 in the second direction D2 moves the actuator 54 from the second position P2 to the first position P1. In this example, an operation of the user operated inputs 56 and 156 in the first direction D1 does not move the actuator 54.

What is claimed is:

1. A bicycle operating device comprising:
   a base member;
   an actuator movably arranged with respect to the base member, and having a cable holder; and
   a user operated input movably arranged with respect to the base member and operatively coupled to the actuator,
   in a state where the actuator is located in a first position with respect to the base member, the user operated input moves the actuator from the first position to a second position with respect to the base member in response to being operated with respect to the base member in a first direction, the second position being different from the first position,
   in a state where the actuator is located in the second position, the user operated input moves the actuator from the second position to the first position in response to being operated in the first direction, and
   in a state where the actuator is located in the second position, the user operated input moves the actuator from the second position to the first position by being operated in a second direction, which differs from the first direction.

2. The bicycle operating device according to claim 1, further comprising:
   a positioning catch arranged with respect to the base member selectively maintain the actuator in each of the first position and the second position.

3. The bicycle operating device according to claim 2, wherein the actuator includes a first actuation engagement portion that is arranged to engage the positioning catch.

4. The bicycle operating device according to claim 3, wherein
   the positioning catch includes a first positioning portion that engages with the first actuation engagement portion in a state where the actuator is located in the second position, and
   the first positioning portion positions the actuator in the second position by engaging with the first actuation engagement portion.

5. The bicycle operating device according to claim 4, further comprising:
   an engagement hook provided to the user operated input; and
   the actuator including a second actuation engagement portion,
   the engagement hook alternately engaging each of the second actuation engagement portion and the positioning catch.

6. The bicycle operating device according to claim 5, wherein
   in a state where the actuator is located in the first position, the engagement hook engages with the second actuation engagement portion, and
   upon the user operated input being operated in the first direction, the engagement hook moves the actuator in the first direction.

7. The bicycle operating device according to claim 5, wherein
   the positioning catch includes a second positioning portion that engages with the engagement hook in a state where the actuator is located in the second position.

8. The bicycle operating device according to claim 7, wherein
   in a state where the actuator is located in the second position, upon the user operated input being operated in the first direction, the engagement hook moves the positioning catch with respect to the base member so that the first actuation engagement portion disengages from the first positioning portion.

9. The bicycle operating device according to claim 7, wherein
   in a state where the actuator is located in the second position, upon the user operated input is operated in the second direction, the engagement hook moves the positioning catch with respect to the base member so that the first actuation engagement portion disengages from the first positioning portion.

10. The bicycle operating device according to claim 9, further comprising:
    a linkage that moves the engagement hook with respect to the user operated input so that the first actuation engagement portion disengages from the first positioning portion.

11. The bicycle operating device according to claim 10, wherein
    the linkage includes a contact portion,
    in a state where the actuator is located in the second position, the user operated input is operated in the second direction to force the contact portion against the actuator, and generate a reaction force in the contact portion by contact with the actuator being transferred to the engagement hook.

12. The bicycle operating device according to claim 7, wherein
    the positioning catch includes a third positioning portion that engages with the first actuation engagement portion in a state where the actuator is located in the first position, and
    the third positioning portion positions the actuator in the first position by engaging with the first actuation engagement portion.

13. The bicycle operating device according to claim 12, wherein in a state where the actuator is located in the first position, the user operated input disengages the first actuation engagement portion from the third positioning portion by being operated in the first direction.

14. The bicycle operating device according to claim 13, wherein
the positioning catch has a positioning position and a release position, which differs from the positioning position, and
the user operated input is operated in the first direction to move the positioning catch from the positioning position to the release position.

15. The bicycle operating device according to claim 2, further comprising:
a reference shaft supporting the actuator and the user operated input to rotate with respect to the base member about a center axis of the reference shaft.

16. The bicycle operating device according to claim 15, further comprising
a first biasing member that biases the user operated input with espect to the base member in the second direction.

17. The bicycle operating device according to claim 16, further comprising:
a holding shaft supporting the positioning catch to rotate about a center axis of the holding shaft.

18. The bicycle operating device according to claim 17, wherein the user operated input is operated in the first direction or the second direction to rotate the positioning catch in a third direction about the center axis of the holding shaft.

19. The bicycle operating device according to claim 18, further comprising:
a second biasing member that biases the positioning catch in a fourth direction that is opposite to the third direction.

20. The bicycle operating device according to claim 19, further comprising:
a third biasing member that biases the actuator with respect to the base member in the second direction.

21. The bicycle operating device according to claim 1, wherein
the user operated input is operable in the first direction and the second direction to be located in one of a first rest position in a state where the actuator is located in the first position and a second rest position in a state where the actuator is located in the second position, and
the bicycle operating device further comprises a position adjuster configured to adjust the second rest position with respect to the first rest position.

22. The bicycle operating device according to claim 21, wherein
the position adjuster operatively coupled to the user operated input to adjust the second rest position so that the second rest position is located at one of a plurality of adjustment positions.

23. The bicycle operating device according to claim 22, wherein
a rest position interval is a distance between the first rest position and the second rest position, and
the plurality of adjustment positions includes
a first adjustment position at which the rest position interval is shortest,
a second adjustment position at which the rest position interval is longest, and
a third adjustment position at which the rest position interval is longer than at the first adjustment position and is shorter than at the second adjustment position.

24. The bicycle operating device according to claim 22, wherein
the position adjuster includes a first member and a second member, which are provided to the user operated input,
the first member includes a plurality of first adjustment engagement portions respectively corresponding to the plurality of adjustment positions, and
the second member includes a second adjustment engagement portion that engages with each of the plurality of first adjustment engagement portions.

25. The bicycle operating device according to claim 1, fu comprising:
a housing that accommodates the actuator.

26. The bicycle operating device according to claim 25, wherein
the housing includes a first housing part and a second housing part that is a part of the user operated input,
the user operated input further includes an operating portion coupled to the first housing part,
the first housing part is rotatably arranged with respect to the second housing part, and
the actuator is rotatably arranged with respect to the first housing part and the second housing part.

27. The bicycle operating device according to claim 26, further comprising:
a handlebar bicycle attachment coupled to the housing to mount on a handlebar of the bicycle.

28. The bicycle operating device according to claim 27, wherein
the housing includes a facing surface facing the handlebar, and
the bicycle attachment is arranged with respect to the housing so that with the bicycle operating device in a mounted state in which the bicycle attachment is mounted on the handlebar, the facing surface of the housing is inclined with respect to a center axis of the handlebar.

29. The bicycle operating device according to claim 28, wherein
a distance between the first housing part and the handlebar in the mounted state is shorter than a distance between the second housing part and the handlebar in the mounted state.

30. The bicycle operating device according to claim 1, wherein
the cable holder of the actuator is attached to a bicycle component that includes one or more of a shifting device, a suspension or an adjustable seatpost by a cable.

31. The bicycle operating device according to claim 30, wherein
the bicycle component is a front derailleur.

32. A bicycle operating device comprising:
a base member;
an actuator movably arranged with respect to the base member, and having a cable holder;
a user operated input that rests in a first rest position with respect to the base member in a state where the actuator is located in a first position, the user operated input moving the actuator from the first position to a second position with respect to the base member upon being operated in a first direction with respect to the base member, and the user operated input rests in a second rest position in a state where the actuator is located in the second position; and a position adjuster configured to adjust the second rest position with respect to the first rest position.

\* \* \* \* \*